US012621099B2

(12) United States Patent
    Kim et al.

(10) Patent No.: US 12,621,099 B2
(45) Date of Patent: May 5, 2026

(54) ELECTRONIC DEVICE TRANSMITTING AND RECEIVING DATA WITH METAVERSE SERVER AND METHOD FOR OPERATING THEREOF

(71) Applicant: Samsung Electronics Co., Ltd., Suwon-si (KR)

(72) Inventors: Hong Kim, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/364,845

(22) Filed: Aug. 3, 2023

(65) Prior Publication Data

US 2024/0097847 A1      Mar. 21, 2024

Related U.S. Application Data

(63) Continuation of application No. PCT/KR2023/008529, filed on Jun. 20, 2023.

(30) Foreign Application Priority Data

Sep. 19, 2022    (KR) ........................ 10-2022-0117737
Oct. 11, 2022    (KR) ........................ 10-2022-0129696

(51) Int. Cl.
    *H04L 5/00*        (2006.01)
    *H04W 72/0453*     (2023.01)
    *H04W 72/1263*     (2023.01)

(52) U.S. Cl.
    CPC ....... *H04L 5/0048* (2013.01); *H04W 72/0453* (2013.01); *H04W 72/1263* (2013.01)

(58) Field of Classification Search
    CPC ............ H04L 5/0048; H04W 72/0453; H04W 72/1263
    See application file for complete search history.

(56) References Cited

U.S. PATENT DOCUMENTS 10,708,836 B1    7/2020  Buyukdura et al.
2015/0128062 A1   5/2015  Jones et al.
                  (Continued)

FOREIGN PATENT DOCUMENTS

KR    10-2016-0061846  A    6/2016
KR    10-2019-0084845  A    7/2019
                  (Continued)

OTHER PUBLICATIONS

International Search Report dated Sep. 20, 2023, issued in International Application No. PCT/KR2023/008529.

*Primary Examiner* — Yu-Wen Chang
(74) *Attorney, Agent, or Firm* — Jefferson IP Law, LLP

(57)                ABSTRACT

An electronic device is provided. The electronic device includes at least one first communication device supporting at least one short-range communication, at least one second communication device supporting cellular communication, and at least one processor. The at least one processor may be configured to transmit a first message for requesting first information to an external electronic device supporting the short-range communication through the at least one first communication device, based on the execution command of the first application, receive a second message including the first information, compare the first information and the second information, transmit and/or receive data corresponding to the first application to and/or from the server through a part of the at least one second communication device, based on the electronic device being determined as the primary device, based on a comparison result of the first information and the second information.

20 Claims, 20 Drawing Sheets

(56)     References Cited

U.S. PATENT DOCUMENTS

| | | |
|---|---|---|
| 2018/0077566 A1 | 3/2018 | Cha et al. |
| 2018/0139794 A1 | 5/2018 | Chae et al. |
| 2018/0343165 A1 | 11/2018 | Anantharaman et al. |
| 2019/0215182 A1* | 7/2019 | Lee ..................... H04W 4/025 |
| 2019/0357136 A1 | 11/2019 | Li |
| 2019/0380159 A1 | 12/2019 | Bangolae et al. |
| 2020/0120458 A1 | 4/2020 | Aldana et al. |
| 2020/0187085 A1 | 6/2020 | Jagannatha et al. |
| 2020/0322255 A1 | 10/2020 | Rahman |
| 2020/0374791 A1* | 11/2020 | Fulzele ................. H04W 88/06 |
| 2021/0212134 A1 | 7/2021 | Sternberg et al. |
| 2021/0385044 A1 | 12/2021 | Scholten et al. |
| 2022/0006847 A1 | 1/2022 | Danielsson et al. |
| 2022/0141292 A1 | 5/2022 | Kim et al. |
| 2023/0146571 A1* | 5/2023 | Chin .................... H04W 88/06 |
| | | 455/452.1 |

FOREIGN PATENT DOCUMENTS

| | | |
|---|---|---|
| KR | 10-2019-0094242 A | 8/2019 |
| KR | 10-2020-0015506 A | 2/2020 |
| KR | 10-2021-0062279 A | 5/2021 |
| KR | 10-2284105 B1 | 7/2021 |
| KR | 10-2022-0039514 A | 3/2022 |
| KR | 10-2022-0057719 A | 5/2022 |
| KR | 10-2022-0125503 A | 9/2022 |
| WO | 2021/032509 A1 | 2/2021 |

* cited by examiner

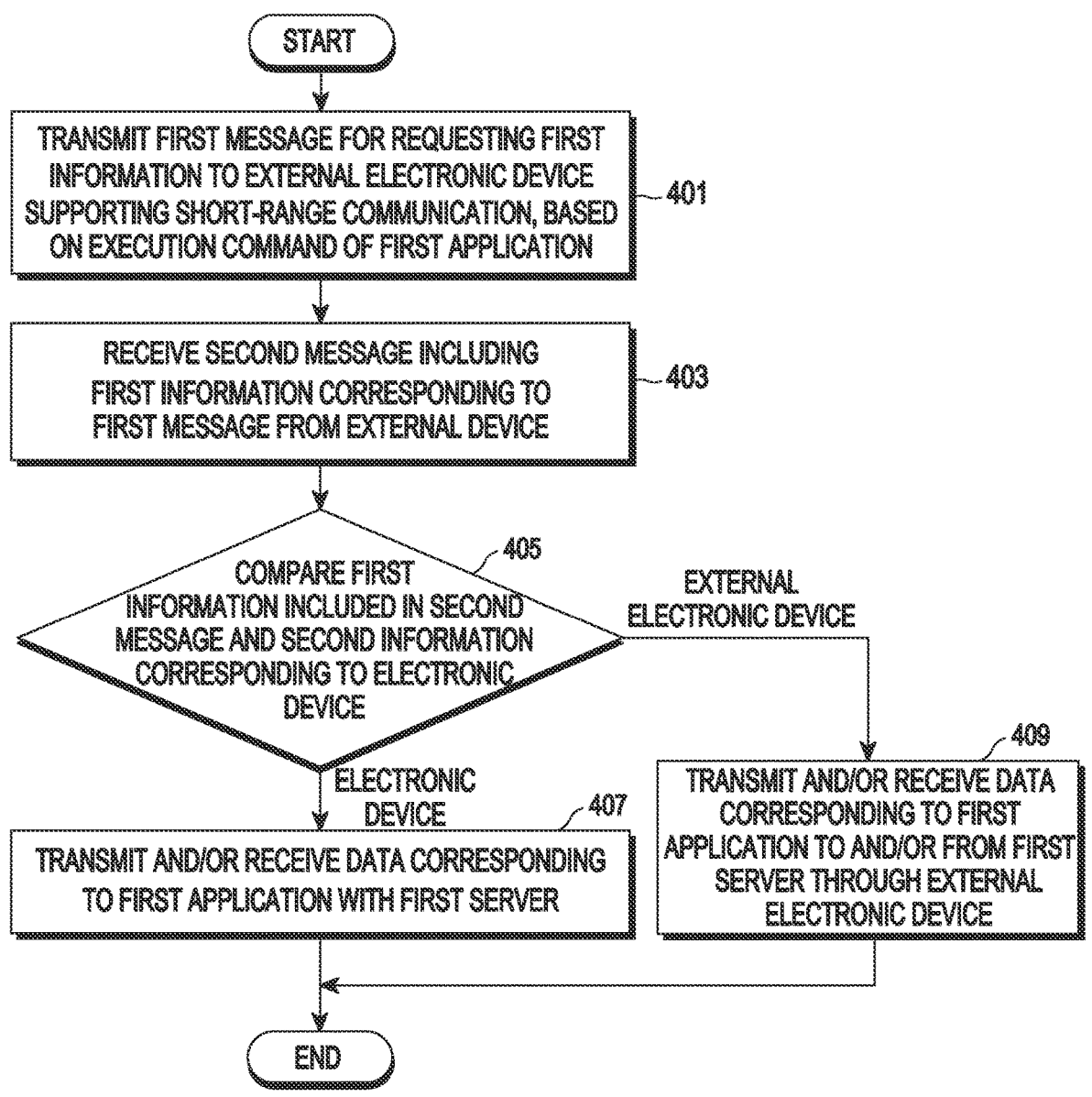

START

TRANSMIT FIRST MESSAGE FOR REQUESTING FIRST INFORMATION TO EXTERNAL ELECTRONIC DEVICE SUPPORTING SHORT-RANGE COMMUNICATION, BASED ON EXECUTION COMMAND OF FIRST APPLICATION — 401

RECEIVE SECOND MESSAGE INCLUDING FIRST INFORMATION CORRESPONDING TO FIRST MESSAGE FROM EXTERNAL DEVICE — 403

405
COMPARE FIRST INFORMATION INCLUDED IN SECOND MESSAGE AND SECOND INFORMATION CORRESPONDING TO ELECTRONIC DEVICE

EXTERNAL ELECTRONIC DEVICE

ELECTRONIC DEVICE — 407

TRANSMIT AND/OR RECEIVE DATA CORRESPONDING TO FIRST APPLICATION WITH FIRST SERVER

409
TRANSMIT AND/OR RECEIVE DATA CORRESPONDING TO FIRST APPLICATION TO AND/OR FROM FIRST SERVER THROUGH EXTERNAL ELECTRONIC DEVICE

END

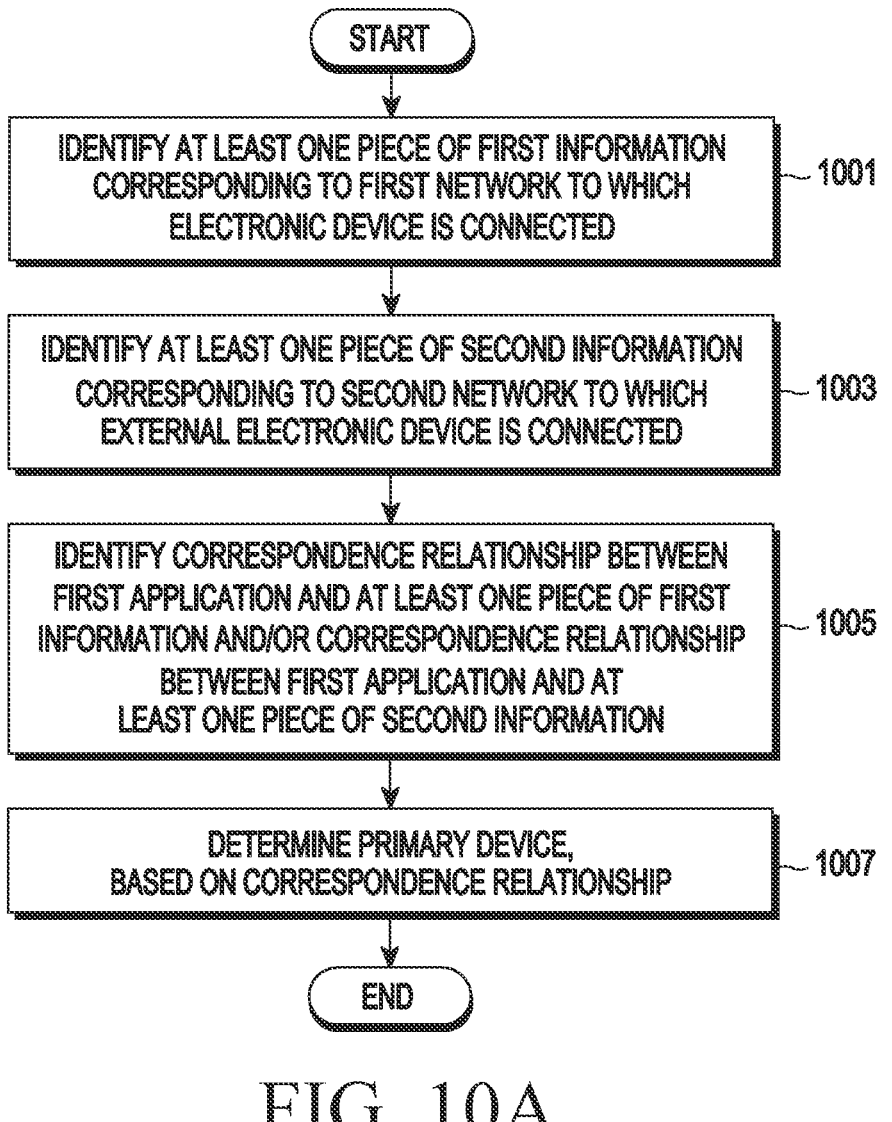

START

IDENTIFY AT LEAST ONE PIECE OF FIRST INFORMATION CORRESPONDING TO FIRST NETWORK TO WHICH ELECTRONIC DEVICE IS CONNECTED — 1001

IDENTIFY AT LEAST ONE PIECE OF SECOND INFORMATION CORRESPONDING TO SECOND NETWORK TO WHICH EXTERNAL ELECTRONIC DEVICE IS CONNECTED — 1003

IDENTIFY CORRESPONDENCE RELATIONSHIP BETWEEN FIRST APPLICATION AND AT LEAST ONE PIECE OF FIRST INFORMATION AND/OR CORRESPONDENCE RELATIONSHIP BETWEEN FIRST APPLICATION AND AT LEAST ONE PIECE OF SECOND INFORMATION — 1005

DETERMINE PRIMARY DEVICE, BASED ON CORRESPONDENCE RELATIONSHIP — 1007

END

FIG. 10A

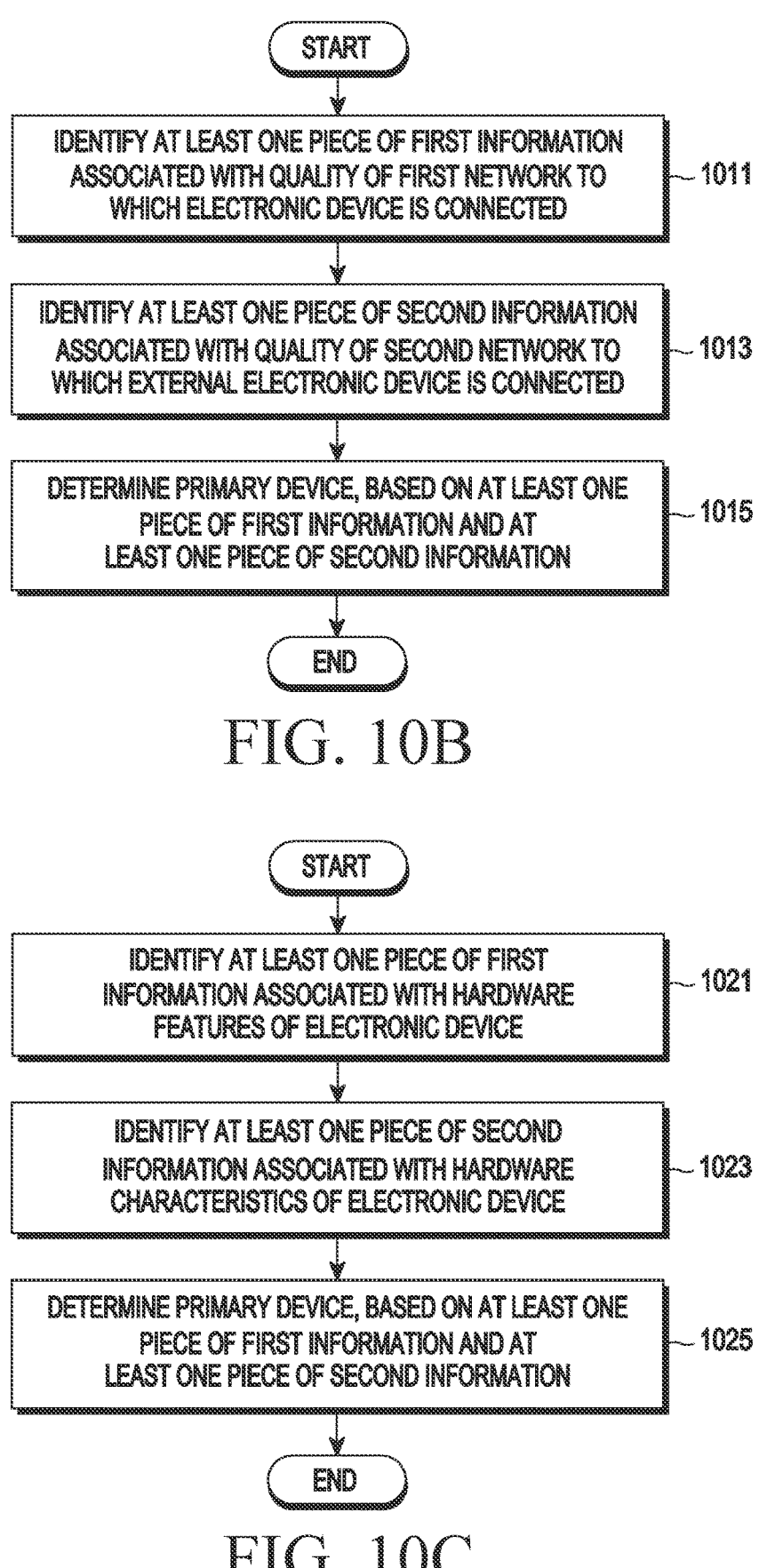

START

IDENTIFY AT LEAST ONE PIECE OF FIRST INFORMATION ASSOCIATED WITH QUALITY OF FIRST NETWORK TO WHICH ELECTRONIC DEVICE IS CONNECTED — 1011

IDENTIFY AT LEAST ONE PIECE OF SECOND INFORMATION ASSOCIATED WITH QUALITY OF SECOND NETWORK TO WHICH EXTERNAL ELECTRONIC DEVICE IS CONNECTED — 1013

DETERMINE PRIMARY DEVICE, BASED ON AT LEAST ONE PIECE OF FIRST INFORMATION AND AT LEAST ONE PIECE OF SECOND INFORMATION — 1015

END

FIG. 10B

START

IDENTIFY AT LEAST ONE PIECE OF FIRST INFORMATION ASSOCIATED WITH HARDWARE FEATURES OF ELECTRONIC DEVICE — 1021

IDENTIFY AT LEAST ONE PIECE OF SECOND INFORMATION ASSOCIATED WITH HARDWARE CHARACTERISTICS OF ELECTRONIC DEVICE — 1023

DETERMINE PRIMARY DEVICE, BASED ON AT LEAST ONE PIECE OF FIRST INFORMATION AND AT LEAST ONE PIECE OF SECOND INFORMATION — 1025

END

FIG. 10C

ELECTRONIC DEVICE TRANSMITTING AND RECEIVING DATA WITH METAVERSE SERVER AND METHOD FOR OPERATING THEREOF

CROSS-REFERENCE TO RELATED APPLICATION(S)

This application is a continuation application, claiming priority under § 365(c), of an International application No. PCT/KR2023/008529, filed on Jun. 20, 2023, which is based on and claims the benefit of a Korean patent application number 10-2022-0117737, filed on Sep. 19, 2022, in the Korean Intellectual Property Office, and of a Korean patent application number 10-2022-0129696, filed on Oct. 11, 2022, in the Korean Intellectual Property Office, the disclosure of each of which is incorporated by reference herein in its entirety.

TECHNICAL FIELD

The disclosure relates to an electronic device transmitting and receiving data with metaverse server and a method for operating the same.

BACKGROUND ART

Content associated with the metaverse is being actively provided. For example, the content associated with the metaverse based on a virtual space that performs designated activities in the virtual space through an avatar may be provided. For example, the content associated with the metaverse based on an augmented reality that allows additional information about the real environment or other objects to appear overlapped on the real environment may be provided. As the content associated with the metaverse is advanced, a large number of users can access the metaverse service.

A large number of users can access the metaverse server using each of devices. Each of the devices may access the metaverse server, based on cellular data communication or institute of electrical and electronics engineers (IEEE) 802.11 type communication corresponding to each of the device. The cellular data communications corresponding to each of the devices may be operated by the same network operator or may be operated by different network operators. In the case of different network operators, the wireless communication environment of each of the cellular data communications may be different. Alternatively, the environment associated with the connection to each metaverse server of cellular data communications, for example, whether a network slice for an application corresponding to the metaverse service is supported, or whether edge computing for the metaverse server is supported may be different. Accordingly, in case various devices access the metaverse server, there may be a difference in the ability of the devices to transmit and receive data to and/or from the metaverse server.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device transmitting and receiving data with metaverse server and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes at least one first communication device supporting at least one short-range communication, at least one second communication device supporting cellular communication, and at least one processor. The at least one processor may be configured to, based on an execution command of a first application, transmit, through the at least one first communication device, a first message for requesting first information to an external electronic device supporting the at least one short-range communication, wherein he first message includes information for identifying the first application, receive, through the at least one first communication device from the external electronic device, a second message including the first information corresponding to the first message, wherein the first information may be used to determine a primary device configured to transmit and/or receive data to and/or from a server corresponding to the first application, compare the first information included in the second message and second information corresponding to the electronic device, wherein the second information may be used to determine the primary device transmitting and/or receiving data to and/or from the server, based on the electronic device being determined as the primary device based on a comparison result of the first information and the second information, transmit and/or receive data corresponding to the first application to and/or from the server through a part of the at least one second communication device and based on the external electronic device being determined as the primary devices based on the comparison result of the first information and the second information, transmit and/or receive, through the at least one first communication device, data corresponding to the first application to and/or from the server through the external electronic device.

In accordance with another aspect of the disclosure, an operation method of an electronic device including at least one first communication device supporting at least one short-range communication and at least one second communication device supporting cellular communication is provided. The operation method includes, based on an execution command of a first application, transmitting, through the at least one first communication device, a first message for requesting first information to an external electronic device supporting the at least one short-range communication wherein the first message includes information for identifying the first application, receiving, through the at least one first communication device, a second message including the first information corresponding to the first message, wherein the first information may be used to determine a primary device configured to transmit and/or receive data to and/or from a server corresponding to the first application, comparing the first information included in the second message and the second information corresponding to the electronic device, wherein the second information may be used to determine the primary device transmitting and/or receiving data to and/or from the server, based on the electronic device being determined as the primary device, based on the comparison result of the first information and the second information, transmitting and/or receiving the data corresponding to the first application to and/or from the server through the at least one second communication device, and based on the comparison result of the first information and the second information, transmitting and/or receiving the data corresponding to the first application from the server through the external electronic device through the at least one first communication device.

In accordance with another aspect of the disclosure, a storage medium is provided. The storage medium include storing instructions that, when executed by at least one processor, cause the electronic device to perform at least one operation. The least one operation includes transmitting a first message for requesting first information to an external electronic device supporting the at least one short-range communication, based on an execution command of a first application, through the at least one first communication device. Here, the first message includes information for identifying the first application. The least one operation includes receiving a second message including the first information corresponding to the first message from the external electronic device through the at least one first communication device. Here, the first information may be used to determine a primary device configured to transmit and/or receive data to and/or from a server corresponding to the first application. The least one operation includes comparing the first information included in the second message and the second information corresponding to the electronic device. Here, the second information may be used to determine the primary device transmitting and/or receiving data to and/or from the server. The least one operation includes transmitting and/or receiving the data corresponding to the first application to and/or from the server through the at least one second communication device, based on the electronic device being determined as the primary device, based on the comparison result of the first information and the second information. The least one operation includes transmitting and/or receiving the data corresponding to the first application from the server through the external electronic device through the at least one first communication device, based on the external electronic device being determined as the primary device, based on the comparison result of the first information and the second information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating a method of operating an electronic device according to an embodiment of the disclosure;

FIG. 6 is a flowchart illustrating operations of an electronic device and at least one external electronic device according to an embodiment of the disclosure;

FIGS. 10A, 10B, 10C, 10D, 10E, and 10F are flowcharts illustrating operating methods of an electronic device according to various embodiments of the disclosure;

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
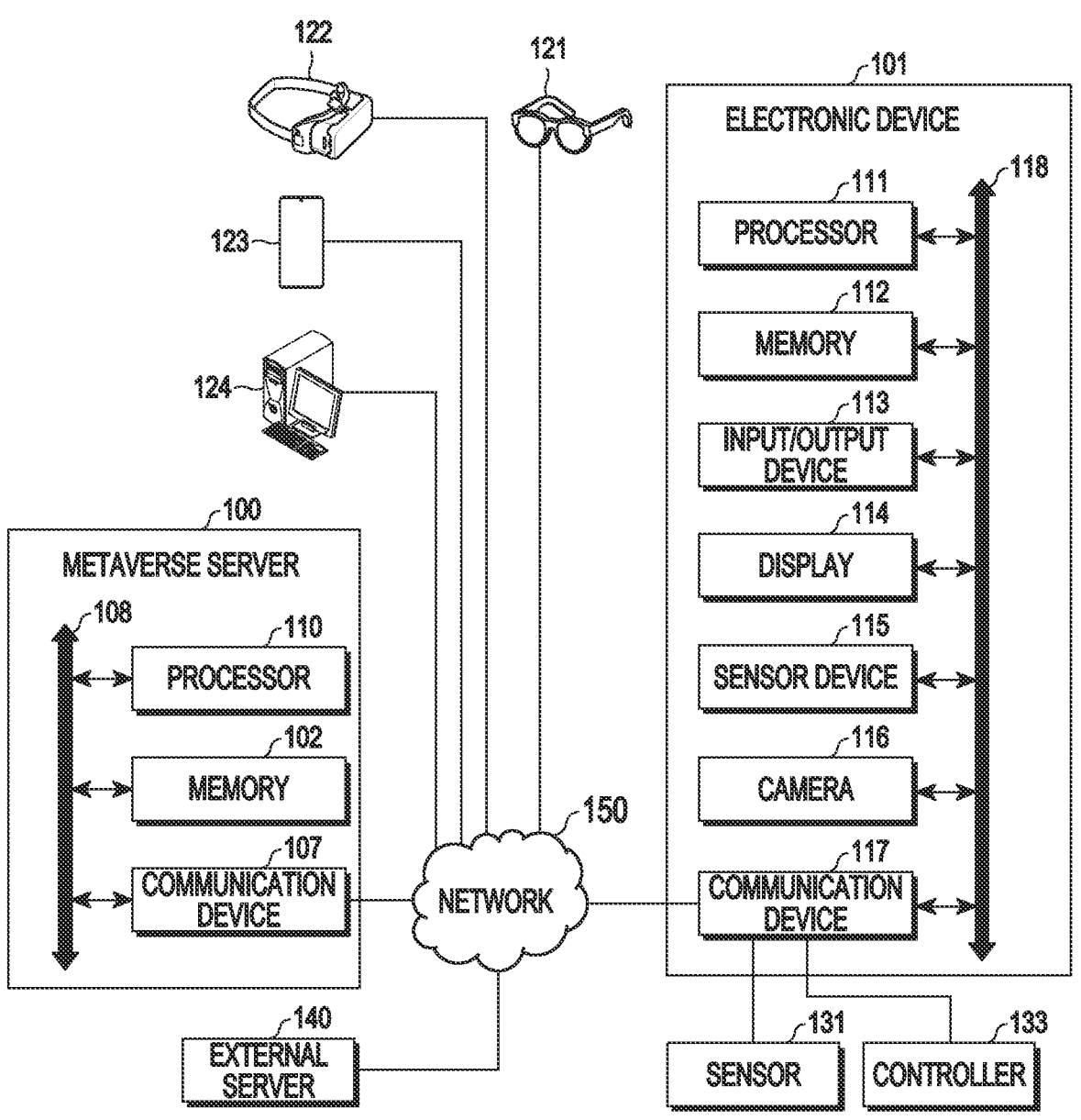
FIG. 1 is a diagram illustrating an artificial reality providing system according to an embodiment of the disclosure.

FIG. 1 is a diagram illustrating an artificial reality providing system according to an embodiment of the disclosure.

Referring to FIG. 1, according to an embodiment, the artificial reality providing system may include at least one of a metaverse server 100, an electronic device 101, at least one external electronic device 121, 122, 123, and 124, or an external server 140.

According to an embodiment, the metaverse server 100 may generate data for representing artificial reality (e.g., at least one of augmented reality environment or virtual reality environment). In addition to augmented reality or virtual reality, the metaverse server 100 may provide content capable of enhancing the user's immersion, and such content may be referred to as content for the metaverse. The metaverse server 100 may include a processor 110, a memory 102, and/or a communication device 107. The metaverse server 100 including the processor 110, memory 102 and/or communication device 107 is merely an example, and at least part of the operations of the metaverse server 100 may be implemented by a cloud server. The metaverse server 100 may be implemented as a distributed server, and those skilled in the art will understand that there is no limitation on the implementation form of the server.

According to an embodiment, the processor 110 may execute command (or instruction) included in a program (or application) stored in the memory 102. The processor 110 may include, for example, a central processing unit (CPU), a graphic processing unit (GPU), a neural processing unit (NPU), a tensor processing unit (TPU), a digital signal processor (DSP), and an application-specific integrated circuit (ASIC), a field programmable gate array (FPGA), and/or a programmable logic device, but is not limited as long as the processor is capable of executing a program (or instructions or instructions). The processor 110 may execute a program for artificial reality. The program for artificial reality may be stored in the memory 102.

According to an embodiment, the memory 102 may include volatile memory and/or non-volatile memory, such as hard disk storage, random access memory (RAM), random nonvolatile memory (ROM), and/or flash memory, but this is illustrative and not limiting. The program for artificial reality is a program for a server, may cause performance of, for example, generating data to represent the artificial reality, providing the generated data, validating user input, and/or generating and providing data to represent the artificial reality that is updated based on the identified user input, and may include commands (or instructions) corresponding to at least part of the operations performed by the metaverse server 100 of the disclosure.

The communication device 107 may support establishment of a communication channel between the metaverse server 100 and the electronic device 101 through the network 150 and communication through the established communication channel. The communication device 107 may be a device capable of providing a wide area network (e.g., Internet), but is not limited thereto. The operations performed by the metaverse server 100 may be performed, for example, by the processor 110 or by other hardware under the control of the processor 110. The commands (or instructions) that cause the performance of operations by the metaverse server 100 may be stored in the memory 102. Through a bus 108 (or communication interface, or network)

of the metaverse server 100, the processor 110, the memory 102, and/or the communication device 107 may transmit/receive data.

According to an embodiment, the electronic device 101 may perform at least one operation (e.g., provision of visual content (e.g., image), provision of auditory content (e.g., voice), provision of tactile content (e.g., vibration), and/or provision olfactory content (e.g., smell), but is not limited thereto) for expressing artificial reality using data for expressing artificial reality. A user who owns or wears the electronic device 101 may experience artificial reality, based on content provided from the electronic device 101. The electronic device 101 may include at least one of a processor 111, a memory 112, an input/output device 113, a display 114, a sensor device 115, a camera 116, or a communication device 117.

The processor 111 may include, for example, a CPU, GPU, NPU, TPU, DSP, ASIC, FPGA, and/or programmable logic device, but is not limited as long as the processor 111 is capable of executing a program (or instructions or instructions). For example, the processor 111 may execute a program for artificial reality. The program for artificial reality is a client program, and may cause, for example, execution of receiving data for representing artificial reality from the metaverse server 100, at least one operation (may include, for example, provision of visual content (e.g., image), provision of auditory content (e.g., voice), provision of tactile content (e.g., vibration), and/or provision of olfactory content (e.g., smell), but is not limited thereto) for representing artificial reality, based on the received data, and validation of user input and/or transmission of user input (or commands corresponding to user input) to the metaverse server 100, and may include commands (or instructions) corresponding to at least part of the operations performed by the electronic device 101 of the disclosure.

According to one embodiment, the memory 112 may include volatile memory and/or non-volatile memory, such as hard disk storage, RAM, ROM, and/or flash memory, but this is illustrative and not limiting. According to one embodiment, the input/output device 113 may include a touch pad, a button, a mouse, a digital pen, and/or a microphone, but is not limited as long as the input/output device 113 is a device for receiving (or sensing) a user input. For example, a touch screen panel, which is an example of the input/output device 113, may be integrally implemented with the display 114. The input/output device 113 may include a speaker, a haptic module, and/or a light emitting module, but is not limited as long as the input/output device 113 is a device for outputting content associated with artificial reality.

According to one embodiment, the sensor device 115 may include a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. According to one embodiment, the camera 116 may include one or more lenses, image sensors, image signal processors, or flashes.

According to one embodiment, the communication device 117 may support establishment of a communication channel between the metaverse server 100 and the electronic device 101 through the network 150, and communication through the established communication channel. The communication device 117 may be a device capable of providing a wide area network (e.g., Internet), but is not limited thereto. The communication device 117 may support wired communication and/or wireless communication. For example, the communication device 117 may support short-range communication (e.g., short-range communication such as Bluetooth, wireless fidelity (Wi-Fi) direct, or infrared data association (IrDA)). The communication device 117 may transmit/receive data with the external sensor 131 and/or the external controller 133, based on short-range communication. For example, when the electronic device 101 is implemented as a standalone type, the communication device 117 may support a function of wirelessly accessing the network 150. The communication device 117 may support cellular communication such as long term evolution (LTE), fifth generation (5G), and sixth generation (6G), and/or IEEE 802 series-based communication (e.g., it may be named Wi-Fi). The communication device 117 may be implemented to support wired communication, and the implementation method is not limited. When the electronic device 101 is implemented as a non-standalone type, the electronic device 101 electronic device 101 may communicate with the metaverse server 100 through a relay device connectable to the network 150. In this case, the communication device 117 may support short-range communication such as Bluetooth, wireless fidelity (Wi-Fi) direct, or infrared data association (IrDA), and may perform communication with the metaverse server 100 through a relay device using short-range communication. The external sensor 131 include a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, and/or an illuminance sensor. The operations performed by the electronic device 101 may be performed by, for example, the processor 111 or other hardware under the control of the processor 111. The commands (or instructions) that cause the electronic device 101 to perform an operation may be stored in the memory 112. Through the bus 118 (or communication interface, or network) of the electronic device 101, the processor 111, the memory 112, the input/output device 113, the display 114, the sensor device 115, the camera 116, and/or the communication device 117 may transmit/receive data. Meanwhile, the transmission and reception of data by the metaverse server 100 and the electronic device 101, based on an application for artificial reality is merely an example, and those skilled in the art will understand that the metaverse server 100 and the electronic device 101 may transmit and receive at least part of data on a web basis.

According to one embodiment, the external sensor 131 may be, for example, a ring-type device, a bracelet-type device, or a head-mounted device, but the type and/or attached user's body part are not limited. The external sensor 131 may provide sensed data to the electronic device 101, based on short-range communication. The controller 133 may include, for example, a touch pad, a button, a mouse, a digital pen, and/or a microphone, but is not limited as long as the controller 133 is a device for receiving (or sensing) a user input. The controller 133 may provide data obtained based on short-range communication to the electronic device 101. In an embodiment, the controller 133 may further include at least one sensor in addition to a device for receiving a user input. In this case, the controller 133 may provide data associated with the user input and/or sensing data to the electronic device 101, based on short-range communication.

According to one embodiment, the metaverse server 100 may receive and transmit data with at least external electronic device 121, 122, 123, 124. The metaverse server 100 may transmit data for representing updated and/or changed artificial reality, based on at least one external electronic device 121, 122, 123, 124 and data to the electronic device 101. The electronic device 101 may perform at least one operation for representing artificial reality, based on data. Accordingly, when a plurality of users exist in one artificial reality, an artificial reality in which an operation by one user is reflected may be provided to other users.

According to one embodiment, the external server 140 may transmit and receive data through the metaverse server 100 and the network 150. The external sensor 131 may be, for example, a server that supports the same application as the metaverse server 100 (or the same artificial reality). Alternatively, the external server 140 may be a server that supports a metaverse server 100 and a different application (or different artificial reality). In this case, the metaverse server 100 may convert the data of the external server 140 into the format of an application (or artificial reality) supported by the metaverse server 100. The metaverse server 100 may transmit data for representing artificial reality reflecting the converted data to the electronic device 101. As described above, the metaverse server 100 may also interact with an artificial reality different from the artificial reality it supports, and this function may be referred to as a multiverse function.

Examples for Virtual Reality

According to one embodiment, the electronic device 101 may be a head mounted device (HMD) supporting virtual reality or a smartphone connectable to a structure that can be fixed to the head. The user may observe each of the image for the left eye and the image for the right eye displayed on the display 114 with both eyes while wearing the HMD on the head or wearing the structure connected to the smartphone on the head. Alternatively, the user may observe an image for representing virtual reality displayed on the display 114 of the electronic device 101 without wearing the electronic device 101 on the head. In this case, the electronic device 101 may be implemented as a smartphone, a tablet, a general-purpose computer, or a smart mirror, but is not limited thereto.

According to one embodiment, the metaverse server 100 may generate data for representing at least one space (or a scene gazing at the space) of virtual reality. For example, the metaverse server 100 may receive information of a first user (e.g., account information and/or information for authentication of first user) from the electronic device 101. The metaverse server 100 may perform a login procedure of the first user, based on the information of the first user. The metaverse server 100 may identify a space corresponding to the first user in virtual reality. For example, the metaverse server 100 may identify the space allocated privately for the first user. For example, the metaverse server 100 may identify a space corresponding to the location of the first user among open spaces. For example, the metaverse server 100 may identify the space corresponding to the user's input. There is no limitation on how the metaverse server 100 checks the space corresponding to the location of the first user. For example, an avatar (or character) corresponding to at least one object and/or user may be included in the identified space. When the viewpoint of the scene is a first-person viewpoint, the data for expression may be associated with the scene where the user look at the identified space from the user's viewpoint. In some cases, the scene where the user look at the identified space may not include an avatar (or character) corresponding to the first user, or may include only a part of the body (e.g., a hand, etc.), but is not limited thereto, and alternatively, the back view of the avatar may be included. When the viewpoint of the scene is a third-person viewpoint, the data for expression may be associated with a scene in which a space including an avatar (or character) corresponding to a user is viewed from one direction.

According to one embodiment, the scene viewed from the user's point of view may include avatars corresponding to other users. For example, a second user may access the metaverse server 100 using the external electronic device 122. The metaverse server 100 may generate data for representing artificial reality used together by the first user and the second user. For example, when both the first user and the second user exist in a specific space, the metaverse server 100 may generate data for expressing artificial reality used together by the first user and the second user. For example, when the viewpoint of the scene is a first-person viewpoint, at least a part of the avatar of the second user may be included in the scene for the first user. For example, when the viewpoint of the scene is a third-person viewpoint, in the scene for the first user, at least a portion of a first avatar (or may be named a character) corresponding to the first user and/or at least a portion of a second avatar (or character) corresponding to the second user may be included. In an embodiment, at least a portion of the scene displayed on the electronic device 101 may be provided to the metaverse server 100. At least part of the scene displayed on the electronic device 101 (or an object corresponding to at least a portion) may be disposed in the virtual reality space.

According to one embodiment, the metaverse server 100 may receive a user input and/or a command corresponding to the user input from the electronic device 101. For example, the electronic device 101 may identify a user input through the input/output device 113. For example, the electronic device 101 may identify a user input through the built-in sensor device 115. For example, the electronic device 101 may obtain a user input from the external sensor 131 and/or the controller 133 connected through the communication device 117. The processor 111 may identify motion information of the electronic device 101 as a user input, based on the sensing data identified through the sensor device 115. For example, the electronic device 101 may obtain a user input from the external sensor 131 and/or the controller 133 connected through the communication device 117.

According to one embodiment, the electronic device 101 may identify commands, based on the user input. The commands may include, but are not limited to, moving within virtual reality, designating objects within virtual reality, manipulating objects within virtual reality, and/or interacting with other avatars, for example. The electronic device 101 may transmit a command to the metaverse server 100. For example, the electronic device 101 may transmit the user input to the metaverse server 100 without verifying the command, based on the user input, and in this case, the metaverse server 100 may transmit the command, based on the user input.

According to one embodiment, the metaverse server 100 may update the space of virtual reality, based on the command, or change to another space. For example, when the command is designation of an object, the space may be updated to reflect a function connected to the designated object. For example, when the command is the manipulation of an object, the space may be updated so that the location of the object is changed. For example, when the command is to perform an action of an avatar, the space may be updated so that the user's avatar performs a corresponding reaction. For example, when the command is an interaction with another avatar, the space may be updated so that the avatar performs a corresponding reaction. For example, when the command is move, the space for display may be changed to another space. It will be appreciated by those skilled in the art that there are no limitations on spatial updates and/or changes in virtual reality, based on commands. In addition to updating and/or changing visual content, the metaverse server 100 may provide auditory content, tactile content, and/or olfactory content. The metaverse server 100 may relay voice data and/or text for chatting between users. For example, the metaverse server 100 may update and/or change a space using association information between commands and updates and/or changes. For example, the metaverse server 100 may store an artificial intelligence model that receives a user input and/or command as an input value and outputs an update and/or change of space as an output value. The metaverse server 100 may update and/or change the space, based on the output value of the artificial intelligence model. For example, the metaverse server 100 may store an artificial intelligence model that provides update and/or change of a space, based on the context of the space without user input. The metaverse server 100 may update and/or change the space, based on the context of the corresponding space using an artificial intelligence model.

According to one embodiment, the metaverse server 100 may transmit data for representing the updated space and/or data for representing the changed space to the electronic device 101. The metaverse server 100 may transmit data for representing the updated space and/or data for representing the changed space to the external electronic device 122 corresponding to the second user. Accordingly, in the external electronic device 122, virtual reality in which a space updated by the first user of the electronic device 101 is reflected may be expressed. In addition, based on the information (e.g., user input and/or command) transmitted from the external electronic device 122 to the metaverse server 100, the metaverse server 100 may update the space that the first user and the second user use (or exist) together. The metaverse server 100 may transmit data for expressing the updated space to the electronic device 101. The electronic device 101 may represent an updated space, based on the received data. As described above, the metaverse server 100 may share the updated space corresponding to any one user to another user's electronic device corresponding to the corresponding space. For example, updating and/or changing a time-sequential space may be referred to as a user experience.

The metaverse server 100 and/or the electronic device 101 may store at least one data associated with the user experience in the memory 102 and/or 112. For example, the metaverse server 100 may store at least one data associated with user experience for each user (e.g., each user account). For example, the metaverse server 100 and/or the electronic device 101 may store data for representation of a point in time in the memory 102 and/or 112 of the user experience. For convenience of explanation, this can be represented as performing capture of user experience. The metaverse server 100 may store data associated with user experience, which may be referred to as life logging. The metaverse server 100 may additionally store data associated with the user. For example, the metaverse server 100 may receive at least one sensing data from the electronic device 101, store the same time-sequentially, or update a final value. The metaverse server 100 may generate a user (e.g., avatar) in virtual reality corresponding to a user in the real world, based on at least one piece of sensing data, and this may be referred to as a digital twin.

Embodiment of Augmented Reality

According to one embodiment, the electronic device 101 may provide content for augmented reality representing at least one visual object that can be seen by overlapping with a real environment viewed by a specific user. At least part of the operations of the metaverse server 100 and/or electronic device 101 described in the embodiment for virtual reality may be performed by the metaverse server 100 and/or electronic device 101 described in the embodiment for augmented reality, and it will be appreciated by those skilled in the art that the reverse is also possible. According to one embodiment, the electronic device 101 may be a glasses-type electronic device supporting augmented reality, a smart lens, or a smartphone capable of displaying a captured image in real time. A user may observe a visual object displayed on a transparent display (or semi-transparent display) of the glasses-type electronic device or smart lens together with a real environment while wearing the glasses-type electronic device or the smart lens. Alternatively, the user may observe an image captured by the smartphone and a visual object displayed to overlap on the image.

According to one embodiment, the electronic device 101 may obtain a foreground image through the camera 116 (e.g., a camera facing forward). The electronic device 101 may transmit the foreground image, a portion of the foreground image, or three-dimensional (3D) modeling data obtained based on the foreground image to the metaverse server 100 through the communication device 117. The electronic device 101 may identify the orientation of the electronic device 101, based on the captured image and/or data sensed by the sensor device 115. The electronic device 101 may transmit data about the posture of the electronic device 101 through the communication device 117. The electronic device 101 may obtain a captured image of the user's eyes using the camera 116 (e.g., a camera facing backward). The electronic device 101 may identify the user's gaze, based on the captured image of the eye. The electronic device 101 may transmit data on the user's gaze through the communication device 117.

According to one embodiment, the metaverse server 100 may generate data for representing at least one visual object that may be seen overlapping with a real environment viewed by a specific user as data for representing artificial reality. The metaverse server 100 may analyze, for example, the data received from the electronic device 101 (data associated with the foreground image, the posture of the electronic device 101, and/or the user's gaze), and identify at least one visual object, based on the analysis result. The metaverse server 100 may transmit data for representing at least one visual object to the electronic device 101 through the communication device 107. At least one visual object may be displayed, for example, by the display 114 of the electronic device 101, and the user may observe at least one visual object overlapping on the real environment. For example, the visual object may have information and/or a form associated with an object disposed in a real environment. In this case, the electronic device 101 may display the visual object so that the visual object can be observed by the user as being located near an object placed in a real environment.

According to one embodiment, the electronic device 101 may identify a user input. For example, the user input may be identified through the input/output device 113 included in the electronic device 101 and/or through the external sensor 131 and/or the controller 133. The user input may, for example, cause designation and/or manipulation of visual objects to be displayed. The electronic device 101 may transmit a user input and/or a command corresponding to the user input to the metaverse server 100. The metaverse server 100 may generate data for representing artificial reality based on user input and/or a command corresponding to the user input. For example, the metaverse server 100 may identify that the user input is based on the designation and/or manipulation of a visual object, and may perform transformation of the visual object, movement of the visual object, and/or provision of another visual object corresponding to the function of the visual object in response thereto, but there are no limitation on the operations performed. The metaverse server 100 may transmit data for representing artificial reality generated based on a user input and/or a command corresponding to the user input to the electronic device 101. The electronic device 101 may provide content associated with artificial reality, based on data for representing artificial reality. As described above, the metaverse server 100 and/or the electronic device 101 may provide a function for a user to interact with visual objects.

According to one embodiment, the metaverse server 100 may generate avatars (or characters) corresponding to other users as data for expressing artificial reality. The metaverse server 100 may transmit the avatars (or characters) corresponding to other users to the electronic device 101. The electronic device 101 may display avatars (or characters) corresponding to other users by using the received data for representing artificial reality. The user may observe avatars (or characters) corresponding to other users overlapping on the real environment. The user can experience as if an avatar (or character) corresponding to another user is located in a real environment. Avatars (or characters) corresponding to other users may be manipulated, for example, by user input obtained from the external electronic devices 121, 122, 123, and 124, and/or may be manipulated based on an artificial intelligence model stored in the server 100, and there is no limitation on how to manipulate the avatars (or characters). Based on the manipulation of the avatars (or characters), the metaverse server 100 may transmit data for representing the manipulated avatar (or character) to the electronic device 101. The electronic device 101 may represent an avatar (or character) manipulated based on the received data, and accordingly, the user can experience as if avatars (or characters) corresponding to other users operate in a real environment. As described above, the metaverse server 100 and/or the electronic device 101 may store user experiences associated with augmented reality in the memories 102 and/or 112. For example, the metaverse server 100 may store at least one data associated with a user experience associated with augmented reality for each user (e.g., each user account). For example, the metaverse server 100 and/or the electronic device 101 may store in the memory 102 and/or 112 data for representation of a point in time among user experiences associated with augmented reality.

It is exemplary that the metaverse server 100 and the electronic device 101 may generate and represent data for representing artificial reality. According to an embodiment, the electronic device 101 may generate data for expressing artificial reality and/or data for artificial reality based on data from the external electronic devices 121, 122, 123, and 124. In this case, the electronic device 101 may generate data for representing artificial reality without data from the metaverse server 100.

Figure 2:
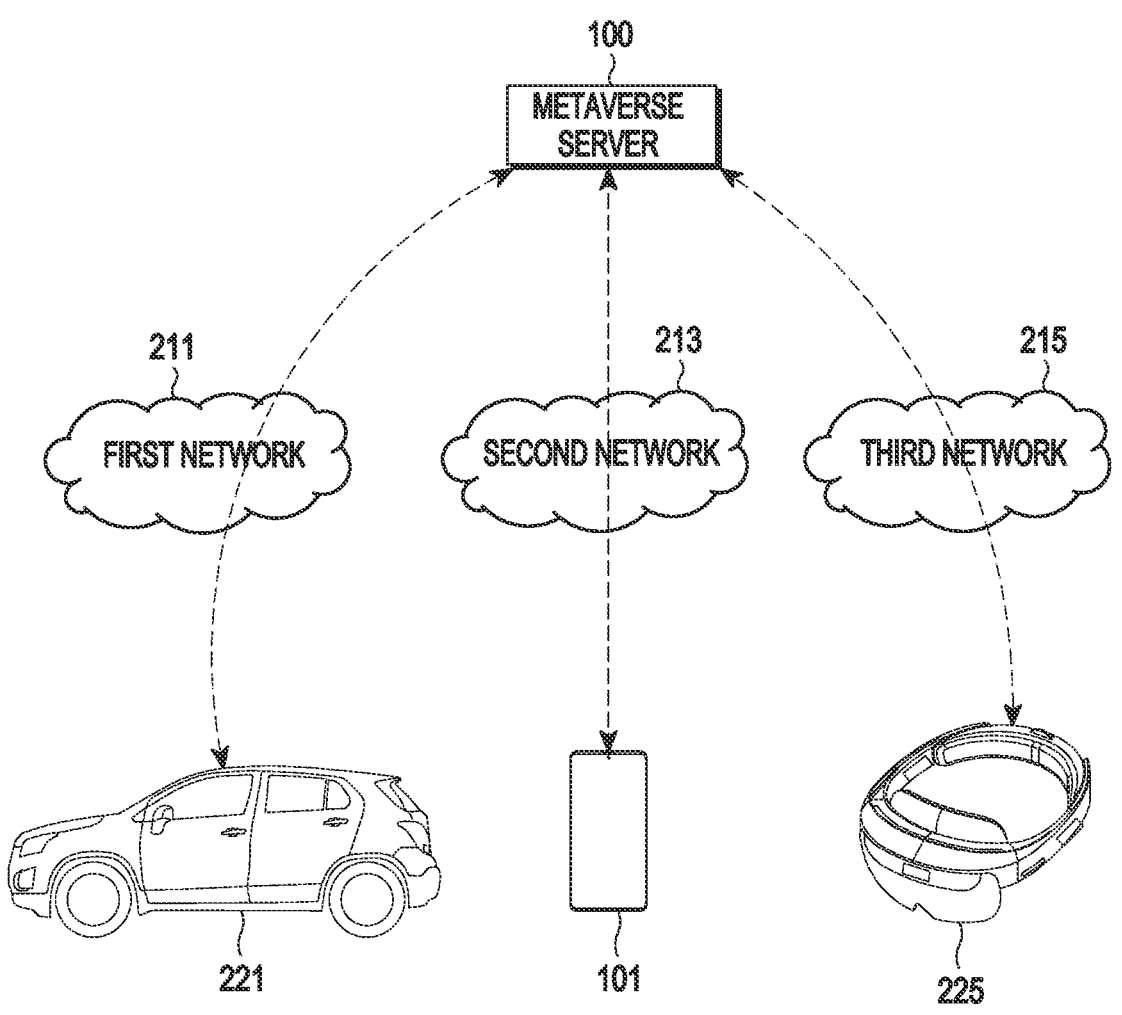
FIG. 2 is a diagram illustrating connection to a metaverse server according to an embodiment of the disclosure.

FIG. 2 is a diagram illustrating connection to a metaverse server according to an embodiment of the disclosure.

Referring to FIG. 2, for example, a first external electronic device 221 (e.g., a car (or its electric field) supporting cellular communication) may access a metaverse server 100 through a first network 211. In the embodiment illustrated in FIG. 2, the first network 211 may be a cellular network established by the first communication service provider. The first network 211 may be a network, based on long term evolution (LTE) communication. The electronic device 101 may access the metaverse server 100 through a second network 213. In the embodiment illustrated in FIG. 2, the second network 213 may be a cellular network established by a second communication operator different from the first communication operator. For example, the second network 213 may be a network, based on 5G communication. For example, the metaverse server 100 may be built by a second communication service provider, or collaboration between the metaverse server 100 and the second communication service provider may be performed. Accordingly, the second network 213 may include edge computing for the metaverse service, or the second network 213 may provide a network slice based on a user route selection policy (URSP) rule for a metaverse service (an application for a metaverse service). For example, a second external electronic device 225 (e.g., the HMD device) may access the metaverse server 100 through a third network 215. The third network 215 may be, for example, a network based on IEEE 802.11 communication (hereinafter referred to as Wi-Fi communication for convenience of description). For example, the first user may board the first external electronic device 221 while carrying the electronic device 101. For example, the second user may board the first external electronic device 221 while wearing the second external electronic device 225. The first user and the second user may want to use the metaverse service together. Accordingly, the first user can access the metaverse server 100 using the electronic device 101, and the second user can access the metaverse server 100 using the second external electronic device 225. However, as described above, there may be differences in the performance of the networks 213 and 215 used. For example, the second network 213, as described above, may support 5G communication, include edge computing for metaverse services, and/or provide network slices for metaverse services. For example, the third network 215 may be a Wi-Fi-based network, and the network connection may be unstable according to the movement of the first external electronic device 221. Accordingly, the data transmission/reception capability (e.g., it may be judged by throughput and/or latency, but there is no limit to parameters for determining capability) with the metaverse server 100, based on the second network 213 may be better than the data transmission/reception capability based on the third network 215. Accordingly, when the first user and the second user interact together in the virtual space of the same metaverse service, there is a possibility that the time of the metaverse service is not synchronized.

Figure 3A:
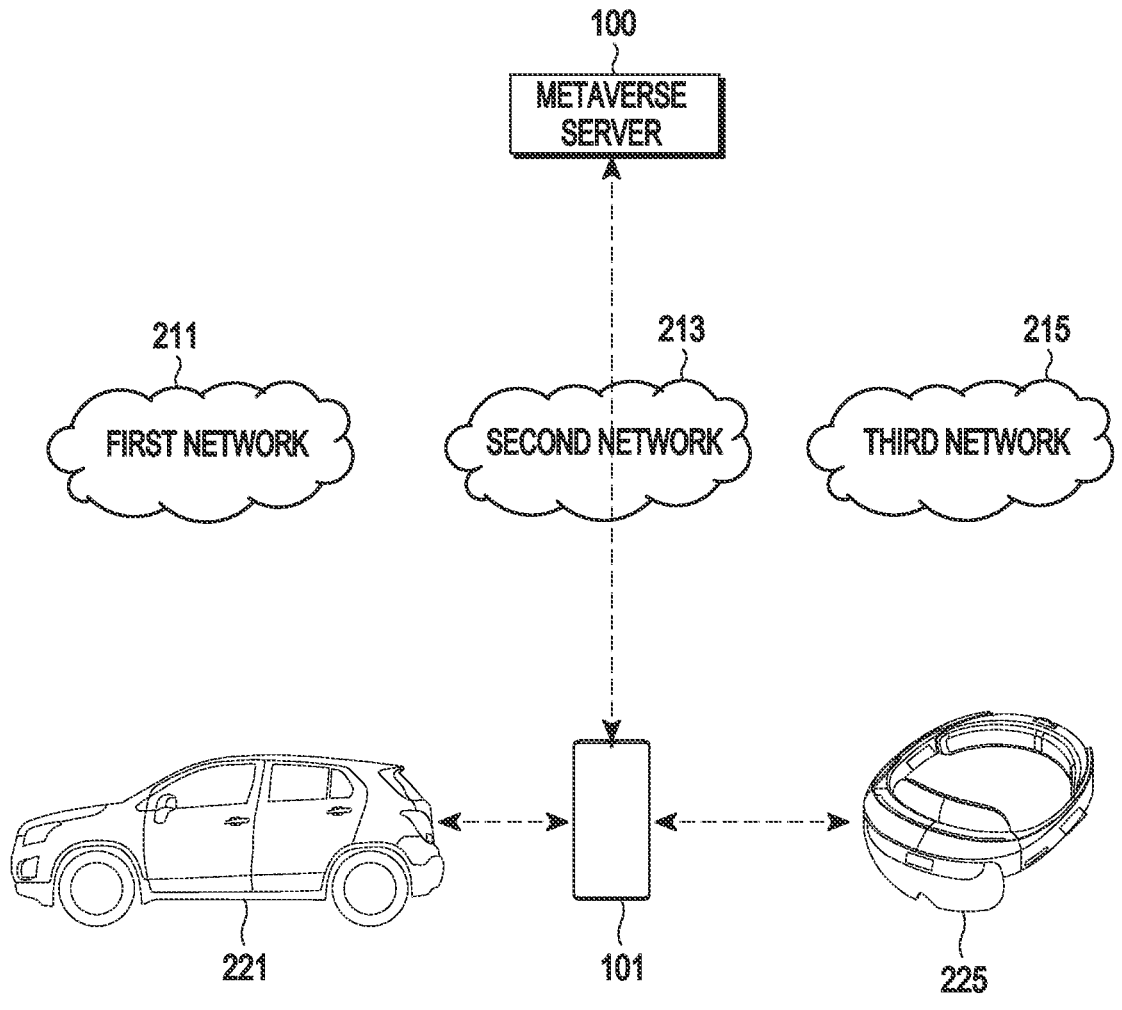
FIGS. 3A, 3B, and 3C are diagrams illustrating access to a metaverse server according to various embodiments of the disclosure.
Figure 3B:
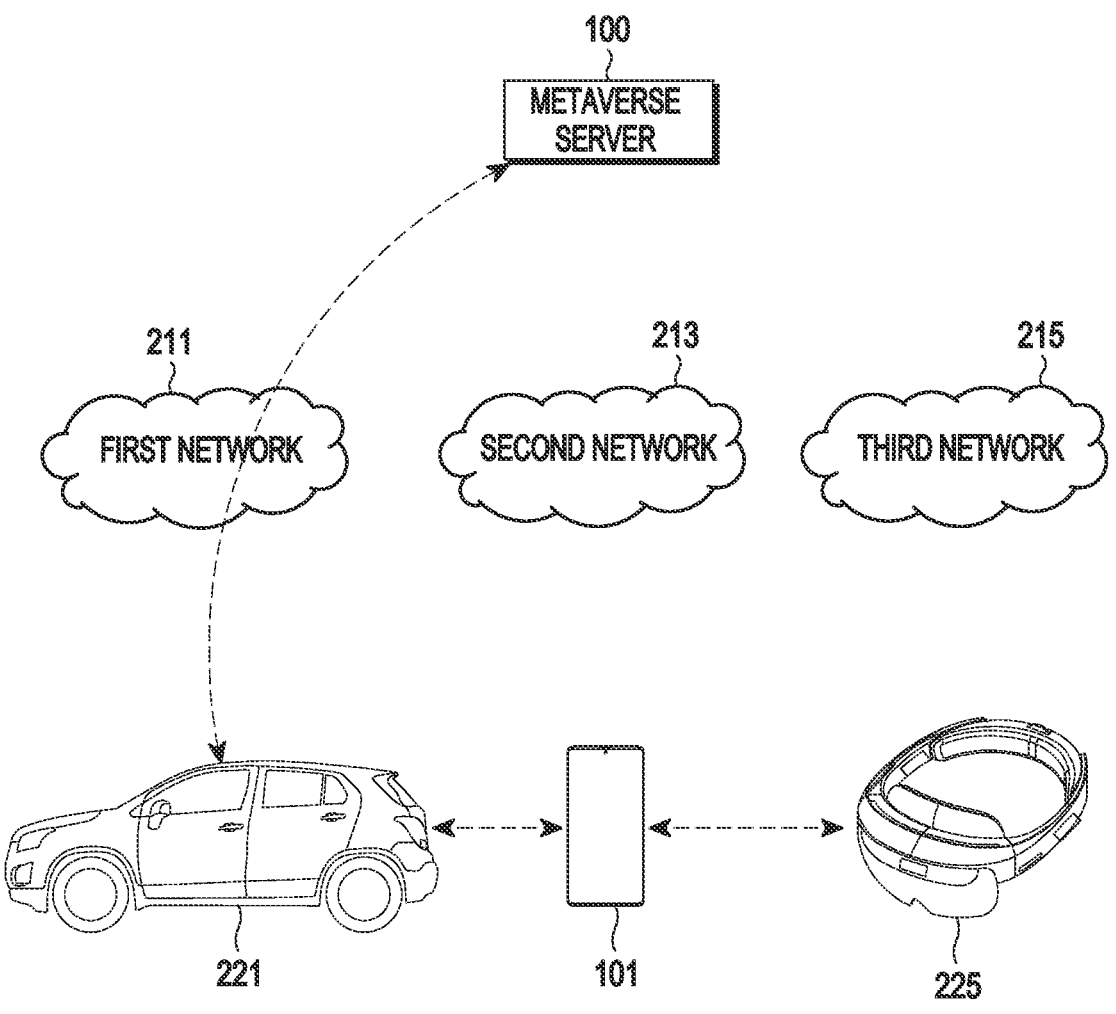
Figure 3C:
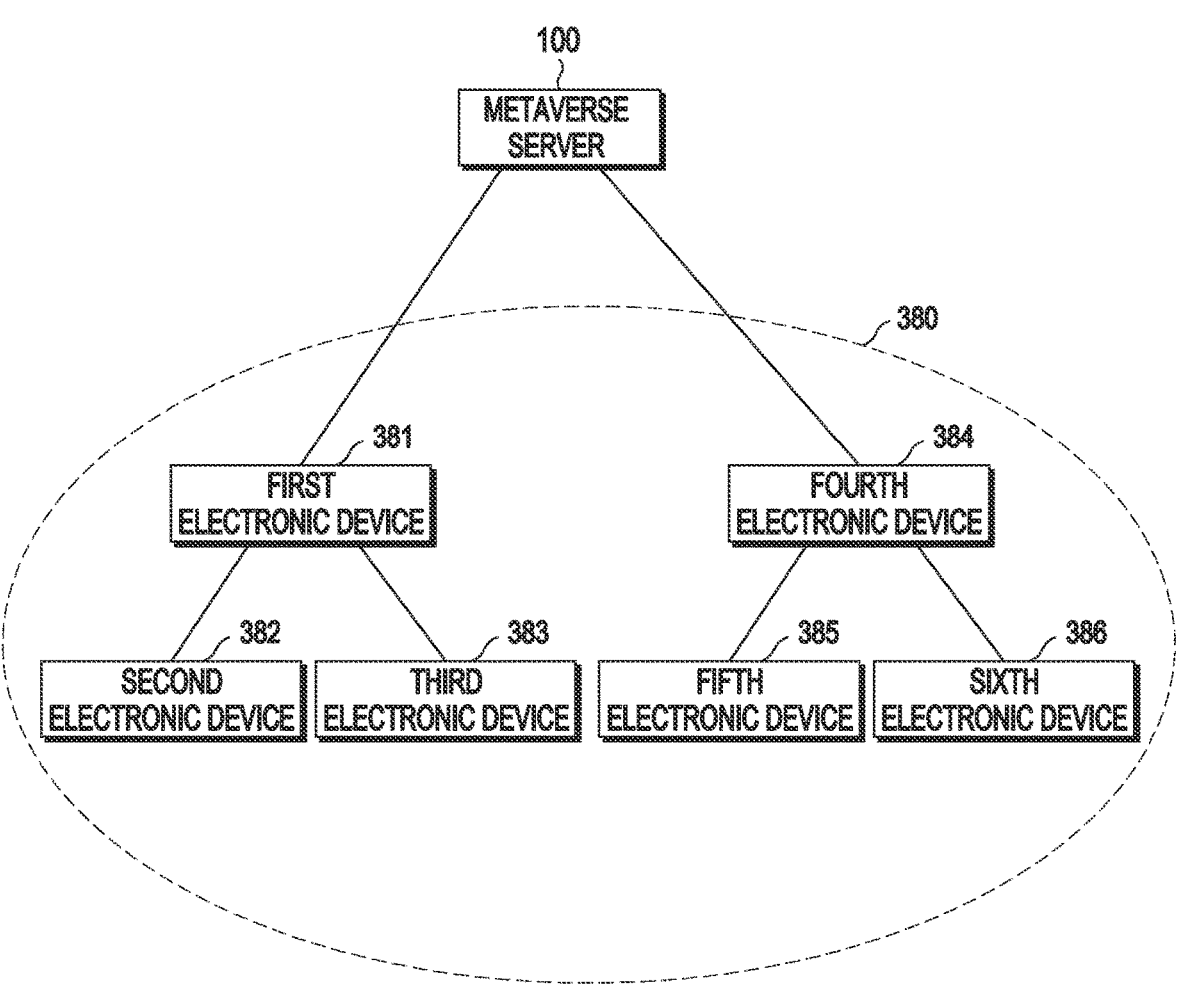

FIGS. 3A, 3B, and 3C are diagrams illustrating access to a metaverse server according to various embodiments of the disclosure.

Referring to FIGS. 3A, 3B, and 3C, as in the above example, it is assumed that the data transmission/reception capability, based on the second network 213 is better than the data transmission/reception capability, based on the first network 211 and the data transmission/reception capability, based on the third network 213. In this case, the electronic device 101 may transmit/receive data, based on the metaverse service executed in the electronic device 101 with the metaverse server 100 through the second network 213. For example, the electronic device 101 may establish a protocol data unit (PDU) session for an application corresponding to the metaverse service. The electronic device 101 may transmit/receive data associated with an application corresponding to a metaverse service executed on the electronic device 101 with the metaverse server 100 through an established PDU session. As described above, since the data transmission/reception capability of the second network 213 is the best, the electronic device 101 may be selected as a primary device in the corresponding physical space. The primary device is an electronic device that establishes a PDU session for transmitting and receiving data with the metaverse server 100, and may refer to a device that relays not only its own data but also data associated with a secondary device located in the periphery to the metaverse server 100. The determination of the primary device and the secondary device will be described later. For example, the electronic device 101 may establish a short-range communication connection (e.g., Wi-Fi direct communication connection, but is not limited thereto) with the first external electronic device 221 and/or the second external electronic device 225 as secondary devices, and may transmit and receive data based on the established short-range communication connection. For example, the electronic device 101 may receive transmission data from the second external electronic device 225, based on a short-range communication (e.g., Wi-Fi and/or Bluetooth, but is not limited thereto) connection, and may transmit the received transmission data of the second external electronic device 225 to the metaverse server 100. For example, the electronic device 101 may receive the received data provided from the metaverse server 100 to the second external electronic device 225, and transmit the received data to the second external electronic device, based on a short-range communication connection.

The electronic device 101 may operate as a data relay device for the metaverse service of the second external electronic device 225. Accordingly, the second external electronic device 225 may also transmit and receive data with the metaverse server 100 using the second network 213, based on relatively good data transmission and reception capabilities. In the above-described embodiment of FIG. 3A, an example in which the primary device is determined as the first electronic device 101, based only on data transmission/reception capabilities of the networks 211, 213, and 215 has been described. However, the primary device may need to be selected based on the capabilities and/or states of the electronic devices 101, 221, and 225, which will be described with reference to FIG. 3B.

Referring to FIG. 3B, the first external electronic device 221 instead of the electronic device 101 may be selected as the primary device. For example, when the remaining battery level of the electronic device 101 is less than or equal to a threshold remaining battery level, the electronic device 101 may not be selected as the primary device. In this case, the first external electronic device 221 having a relatively large battery capacity (or having a second priority) may be selected as the primary device. The first external electronic device 221 may access the metaverse server 100 through the first network 211. For example, the first external electronic device 221 may establish a short-range communication connection (e.g., Wi-Fi direct communication connection, but is not limited thereto) with the electronic device 101 and/or the second external electronic device 225, which are secondary devices, and transmit/receive data, based on the established short-range communication connection. For example, the first external electronic device 221 may receive transmission data from the electronic device 101 and/or the second external electronic device 225 based on a short-range communication connection, and transmit the received transmission data of the electronic device 101 and/or the second external electronic device 225 to the metaverse server 100. For example, the first external electronic device 221 may receive the received data provided from the metaverse server 100 to the electronic device 101 and/or the second external electronic device 225, and provide received data to the electronic device 101 and/or the second external electronic device 225, based on the short-range communication connection. The first external electronic device 221 may operate as a data relay device for the metaverse service of the electronic device 101 and/or the second external electronic device 225. Accordingly, stable metaverse service may be performed by transmitting/receiving data with the metaverse server 100, based on the first external electronic device 221 having a relatively large battery capacity.

In addition to this, an electronic device corresponding to a network with the lowest communication fee may be determined as a primary device. An electronic device corresponding to a network with the best communication quality may be determined as a primary device. Alternatively, an electronic device corresponding to a network having a correspondence relationship with a corresponding metaverse service (e.g., providing a URSP rule for the corresponding application or providing edge computing corresponding to the corresponding metaverse service) may be determined as a primary device. Alternatively, when the service is unavailable to other networks, an electronic device corresponding to a network capable of providing a service may be determined as a primary device. Table 1 is an example of the URSP rule.

TABLE 1

| Rule number | Rule prece-dence | Traffic descriptor | Path selection descriptor |
|---|---|---|---|
| 1 | 1 | App Descriptor = AppID1 | Precedence = 1 S-NSSAI = 101 SSC Mode = 2 |
| 2 | 2 | App Descriptor = AppID1 | [RSD (route selection descriptor) I] Precedence = 1 S-NSSAI = 102, SSC Mode = 2 Time Window = TimeVal__a1~ TimeVal__a2 Location Criteria = Location__a [RSD 2] Precedence = 2 S-NSSAI = 103, DNN = internet.mno.com SSC Mode = 1 Time Window = TimeVal__b1~ TimeVal__b2 Location Criteria = Location__b |
| 3 | 3 | * (match all) | Precedence = 1 S-NSSAI = 1 DNN = internet.mno2.com |

Referring to Table 1, in rule number "1" of the URSP rules, the traffic descriptor may include information that the application descriptor is AppID1, and the path selection descriptor may include information that precedence is 1, network slice selection assistance information (S-NSSAI) is 101, and session and service continuity (SSC) mode is 2. For example, when a network connection request (e.g., request-Network) is identified from an application of AppID1, the electronic device 101 may perform at least one operation for establishing a PDU session using the path selection descriptor of the URSP rule of rule number "1". According to an embodiment, an electronic device having a URSP rule including a traffic descriptor corresponding to an AppID of a specific application (e.g., a metaverse application) may be selected as a primary device. In rule number "2" of the URSP rules, information indicating that the application descriptor is AppID2 may be included in the traffic descriptor. In rule number "3" of the URSP rules, the application descriptor is unlimited in the traffic descriptor (for example, match all), and the path selection descriptor may include information that precedence is 1, S-NSSAI is 1, and deep neural network (DNN) is internet.mno2.com. For example, if a network connection request is identified from an application that does not correspond to the traffic descriptor of rule number "1" and rule number "2", the electronic device 101 may perform at least one operation for establishing a PDU session using the path selection descriptor of the URSP rule of rule number "3".

In the embodiments of FIGS. 3A and 3B, it has been described that one primary device relays data for at least one other secondary device, but this is exemplary, and it may be possible to set a plurality of primary devices in one physical space. For example, referring to FIG. 3C, a plurality of electronic devices 381, 382, 383, 384, 385, and 386 may be located in one physical space 380. The plurality of electronic devices 381 to 386 may execute the first application and access the metaverse server 100. In some cases, a plurality of devices access the metaverse server 100, and when one primary device is set as described above, there is also a possibility that communication capability (e.g., throughput and/or latency (TP) and/or latency, but not limited) may decrease due to a rapid increase in data traffic and/or data processing to and/or from the primary device. Accordingly, for load balancing, a plurality of primary devices may be set in one physical space 380.

For example, in the embodiment of FIG. 3C, the first electronic device 381 may be set as the primary device of the second electronic device 382 and the third electronic device 383, which are secondary devices, and the fourth electronic device 384 may be set as the primary device of the fifth electronic device 385 and the sixth electronic device 386, which are secondary devices. As will be described later, at least one entity of the electronic devices 381 to 385 or the metaverse server 100 may collect information of the entities, and select a primary device, based on a comparison result of the collected information (or a comparison result of a score calculated according to the information). In this case, the entity that selects the primary device may predict communication capability (e.g., TP and/or latency) when a specific entity is selected as the primary device. As a result of the prediction, if it is identified that the communication capability is degraded according to the heavy load, the entity may select a plurality of primary devices and/or at least one secondary device corresponding to each of the plurality of primary devices (this may be referred to as grouping). Alternatively, the entity may select multiple primary devices, based on the number of secondary devices connected to a specific primary device exceeding a threshold number. Accordingly, the first electronic device 381 can relay data corresponding to the second electronic device 382 and the third electronic device 383, and the fourth electronic device 384 may relay data corresponding to the fifth electronic device 385 and the sixth electronic device 386.

FIG. 4 is a flowchart illustrating a method of operating an electronic device according to an embodiment of the disclosure.

Referring to FIG. 4, according to an embodiment, an electronic device 101 (e.g., the processor 111) may transmit a first message for requesting first information to an external electronic device (e.g., the external electronic devices 221 and 225) supporting short-range communication in operation 401, based on the execution command of a first application. The first message may include information for identifying the first application. In operation 403, the electronic device 101 may receive a second message including the first information corresponding to the first message from the external electronic device (e.g., the external electronic devices 221 and 225). The first message may cause the receiving external electronic device to transmit the second message including the first information used to determine the primary device sending and/or receiving data to and/or from the server (e.g., the metaverse server 100) corresponding to the first application.

In an example, the electronic device 101 may discover and/or establish a communication connection (e.g., may be Bluetooth connection, bluetooth low energy (BLE) connection, Wi-Fi-Direct connection, a communication connection based on a Wi-Fi hot spot, and/or a short-range communication connection such as a ultra-wideband (UWB) connection, but is not limited thereto) with an external electronic device (e.g., the external electronic devices 221 and 225) supporting short-range communication, based on an execution command of the first application. In this case, the electronic device 101 may include and transmit information for identifying the first application in at least one of the messages transmitted and received for discovery and/or communication connection establishment, and there is no limitation on the message including the information for identifying the first application. The external electronic device (e.g., the external electronic devices 221 and 225) receiving the first message including the information for identifying the first application may transmit a second message in response thereto. The second message may be, for example, a message in response to the first message in a short-distance communication protocol, but is not limited thereto, and the second message may be a message transmitted after at least one message is transmitted and received after receiving the first message. For example, the second message may be one of messages for discovery and/or communication connection establishment, or a message transmitted and received after communication connection establishment.

In an example, the electronic device 101 may transmit the first message including information for identifying the first application after a communication connection is established between the electronic device 101 and the external electronic device (e.g., external electronic devices 221 and 225). The electronic device 101 may transmit the first message to the external electronic device (e.g., the external electronic devices 221 and 225) using the established communication connection. Alternatively, the electronic device 101 may obtain an execution command of the first application before establishing a communication connection, establish the communication connection in response thereto, and then transmit the first message using the established communication connection. As described above, there is no limitation on the type and/or transmission timing of the first message that causes transmission of the first information, and there is no limitation on the type and/or transmission timing of the second message including the first information.

According to an embodiment, the electronic device 101 may compare the first information included in the second message and the second information corresponding to the electronic device 101, in operation 405. As described above, the first information may be used to determine a primary device configured to transmit and/or receive data with a server (e.g., the metaverse server 100) corresponding to the first application. The first information may correspond to an external electronic device (e.g., the external electronic devices 221 and 225), and the second information may be information used to determine a primary device corresponding to the electronic device 101. The first information and the second information may include, for example, at least part of the same types of parameters. The first information may include, for example, at least one parameter associated with a correspondence relationship between a network and an application, which will be described with reference to FIG. 10A. The first information may include, for example, at least one parameter associated with network quality, which will be described with reference to FIG. 10B. The first information may include, for example, at least one parameter associated with hardware characteristics of the electronic device, which will be described with reference to FIG. 10C. The first information may include, for example, at least one parameter associated with the current state of the electronic device, which will be described with reference to FIG. 10D. Based on a comparison result of the first information and the second information, at least one of the electronic device 101 and the external electronic device (e.g., the external electronic devices 221 and 225) may be selected as the primary device. Alternatively, the first information may be represented as a score calculated based on a parameter, which will be described later.

Based on the selection of the electronic device 101 as the primary device, based on the comparison result, according to an embodiment, the electronic device 101 may transmit and/or receive data corresponding to the first application with a server (e.g., metaverse server 100), in operation 407. Although not shown, the electronic device 101 may notify the external electronic device (e.g., the external electronic devices 221 and 225) that the electronic device 101 is selected as the primary device. The electronic device 101 may relay data corresponding to the first application of the external electronic devices (e.g., the external electronic devices 221 and 225) to transmit and receive data to and/or from the metaverse server 100.

Based on the selection of the electronic device 101 as the primary device, based on the comparison result, according to an embodiment, in operation 409, the electronic device 101 may transmit and/or receive data corresponding to the first application from the server through the external electronic device (e.g., the external electronic devices 221 and 225). For example, the electronic device 101 may notify the external electronic device (e.g., the external electronic devices 221 and 225) that the external electronic device (e.g., the external electronic devices 221 and 225) is selected as the primary device. Thereafter, the electronic device 101 may transmit transmission data associated with the first application to the metaverse server 100, based on relaying of external electronic devices (e.g., external electronic devices 221 and 225). For example, the electronic device 101 may receive reception data from the metaverse server 100 through relaying of external electronic devices (e.g., external electronic devices 221 and 225). As described above, the primary device may relay data corresponding to the first application of the at least one secondary device.

In operations 401 to 405, the acquisition of the first information and the selection of the primary device, based on the comparison between the first information and the second information performed by the electronic device 101 are simply examples.

The collection of information for the selection of the primary device and the selection of the primary device may be performed by another entity (e.g., external electronic devices (e.g., external electronic devices 221 and 225) and/or the metaverse server 100), which will be described later.

Figure 5:
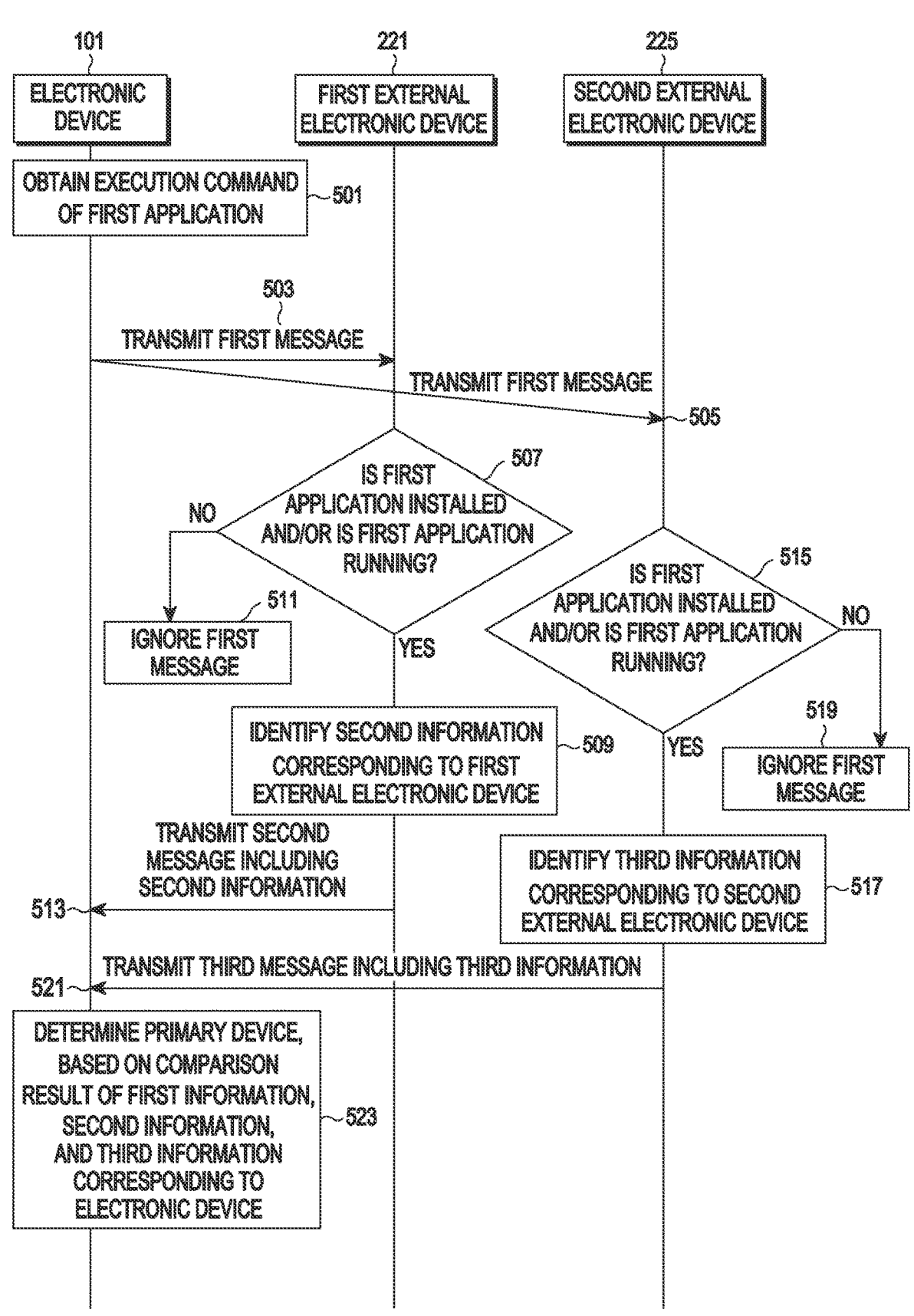
FIG. 5 is a flowchart illustrating operations of an electronic device and at least one external electronic device according to an embodiment of the disclosure.

FIG. 5 is a flowchart illustrating operations of an electronic device and at least one external electronic device according to an embodiment of the disclosure.

Referring to FIG. 5, according to an embodiment, in operation 501, an electronic device 101 may obtain an execution command of a first application. In operation 503, the electronic device 101 may transmit a first message for requesting information for determining a primary device. In operation 505, the electronic device 101 may transmit the first message for requesting information for determining the primary device. For example, transmission of the first message may be performed in the background or as at least a part of the operations of the first application, and is not limited thereto. In an example, the electronic device 101 may include identification (ID) information of the first external electronic device 221 in the first message transmitted to a first external electronic device 221, and may include identification information of a second external electronic device 225 in the first message transmitted to the second external electronic device 225. In an example, the electronic device 101 may broadcast the first message, and in this case, those skilled in the art will understand that operations 503 and 505 are one operation. As an example, the electronic device 101 may transmit the first message for requesting first information based on satisfaction of a specified event after executing the first application. For example, while the first application is executed and the metaverse service is provided, the electronic device 101 may transmit the first message for requesting information for determining a primary device, based on the discovery of an external electronic device and/or satisfaction of a condition indicating a decrease in communication capability, but there is no limitation. As described above, the first message may include identification information of the first application. The external electronic devices 106 and 107 may identify information for determining a primary device for a metaverse service corresponding to the first application, based on the identification information of the first application included in the received first message. For example, information for determining a primary device may be different for each application. When the primary device is determined according to whether a URSP rule corresponding to the corresponding application exists, the information for determining the primary device corresponding to the first application may be whether there is a URSP rule corresponding to identification information (e.g., AppID) of the first application, and the information for determining the primary device corresponding to the first application may be whether there is a URSP rule corresponding to identification information of the second application.

According to an embodiment, in operation 507, the first external electronic device 221, may identify whether the first application is installed and/or whether the first application is running. If the first application is not installed and/or is not running (507—No), the first external electronic device 221 may ignore the received first message in operation 511. When the first application is installed and/or the first application is running (507—Yes), the first external electronic device 221 may identify second information (e.g., information for determining a primary device) corresponding to the first external electronic device 221, in operation 509. The first external electronic device 221 may transmit a second message including the identified second information to the electronic device 101 in operation 513. In an example, when the first application is installed, the first external electronic device 221 may be set to transmit the second message in response to the first message regardless of whether the first application is executed or not. In an example, the first external electronic device 221 may be set to transmit a second message in response to the first message when the first application is executed (including execution in the foreground and/or execution in the background, but is not limited thereto), and may be set to ignore the first message when the first application is not running. In an example, the first external electronic device 221 may be configured to transmit the second message in response to the first message when an additional condition (e.g., user consent and/or interaction authority setting) is satisfied. The conditions set for transmitting the second message are not limited, and the second message may be transmitted when the first message is received regardless of whether the condition is satisfied.

According to an embodiment, the second external electronic device 225 may identify whether the first application is installed and/or whether the first application is running, in operation 515. When the first application is not installed and/or is not running (515—No), the second external electronic device 225 may ignore the received first message in operation 519. When the first application is installed and/or the first application is running (515—Yes), the second external electronic device 225 may identify third information (e.g., information for determining a primary device) corresponding to the second external electronic device 225, in operation 517. The second external electronic device 225 may transmit a second message including the identified second information to the electronic device 101 in operation 521. In operation 523, the electronic device 101 may determine a primary device, based on a comparison result of the first information corresponding to the electronic device 101, the received second information corresponding to the first external electronic device 221, and the received third information corresponding to the second external electronic device 225. For example, the electronic device 101 may select the electronic device corresponding to the highest score as the primary device, based on the first score calculated based on the first information, the second score calculated based on the second information, and the third score calculated based on the third information. However, this is an example, and information may be expressed as a score. A method for calculating the score is not limited, and those skilled in the art will understand that any method for selecting an electronic device having the best communication capability other than the score-based selection method may be used without limitation.

Figure 6:
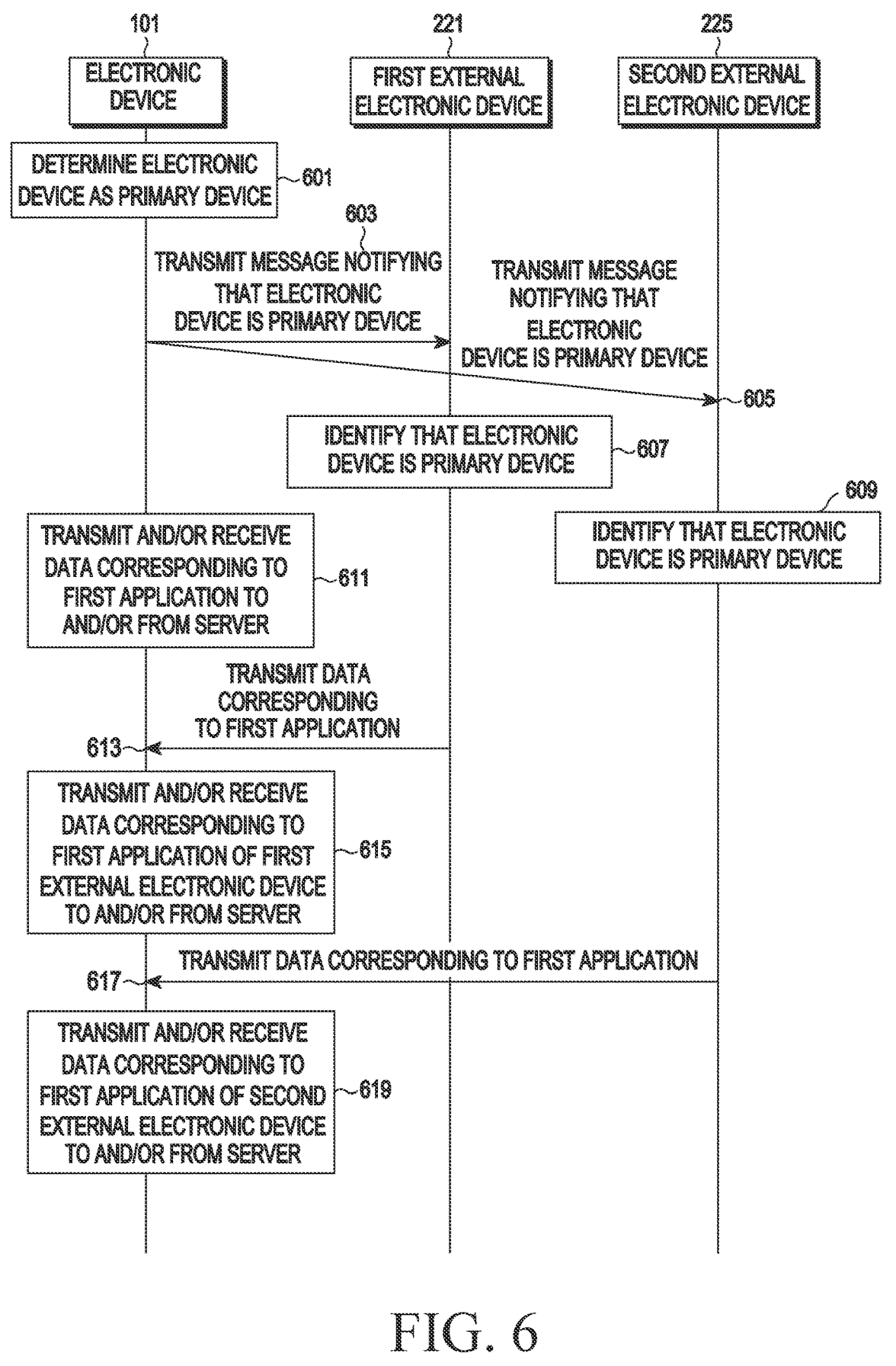

FIG. 6 is a flowchart illustrating operations of an electronic device and at least one external electronic device according to an embodiment of the disclosure.

Referring to FIG. 6, according to an electronic device 101 may determine the electronic device 101 as a primary device in operation 601. For example, as described with reference to FIG. 5, the electronic device 101 may determine the primary device, based on the comparison result of the first information corresponding to the electronic device 101, the received second information corresponding to the first external electronic device 221, and the received third information corresponding to the second external electronic device 225, and there is no limitation on the determining method. In operation 603, the electronic device 101 may transmit a message notifying that the electronic device 101 is the primary device for the first application to the first external electronic device 221. In operation 605, the electronic device 101 may transmit a message notifying that the electronic device 101 is the primary device for the first application to the second external electronic device 225. Those skilled in the art will understand that operations 603 and 605 may be one operation when the message indicating that the device is a primary device is multicast or broadcasted. In operation 607, the first external electronic device 221 may identify that the electronic device 101 is a primary device. In operation 609, the second external electronic device 225 may identify that the electronic device 101 is the primary device. Those skilled in the art will understand that the primary device may be configured to additionally obtain additional confirmation (e.g., user confirmation but not limited to) of whether to relay data of other electronic devices, and relay data based thereon.

In operation 611, the electronic device 101 may transmit and/or receive data corresponding to the first application with a server (e.g., the metaverse server 100), based on being selected as the primary device. For example, the electronic device 101 may establish a PDU session (or may be a packet data network (PDN) session, and/or an evolved packet system (EPS) bearer, but is not limited) with a server (e.g., the metaverse server 100) for the first application. The electronic device 101 may transmit and/or receive data corresponding to the first application with a server (e.g., the metaverse server 100) through the established PDU session. When the electronic device 101 communicates with a server (e.g., metaverse server 100) through cellular communication, the processor 111 may provide transmission data corresponding to the first application to a communication processor for cellular communication, and/or may receive received data from a server (e.g., metaverse server 100) through a communication processor.

According to an embodiment, the first external electronic device 221 may transmit data corresponding to the first application to the electronic device 101 in operation 613. As described above, because the first external electronic device 221 has identified that the electronic device 101 is the primary device for the first application, the first external electronic device 221 may transmit data corresponding to the first application to the electronic device 101. Depending on the implementation, other data (e.g., data corresponding to the second application) of the first external electronic device 221 may be transmitted based on cellular communication of the first external electronic device 221 instead of relaying the electronic device 101. The first external electronic device 221 may transmit data corresponding to the first application to the electronic device 101 through a short-range communication device (e.g., a Wi-Fi module, but is not limited thereto) instead of a communication module for cellular communication. The electronic device 101 may receive data corresponding to the first application through a short-distance communication device (e.g., a Wi-Fi module, but is not limited thereto) instead of a communication module for cellular communication. In operation 615, the electronic device 101 may transmit the received data corresponding to the first application of the first external electronic device 221 to a server (e.g., the metaverse server 100), and/or may transmit data received from a server (e.g., the metaverse server 100) to the first external electronic device 221. For example, the electronic device 101 may identify the first external electronic device

221 and/or the metaverse server 100, based on the destination internet protocol (IP) address included in the outgoing and/or incoming IP packets, but this is an example and the identification method is not limited. The second external electronic device 225 may transmit data corresponding to the first application to the electronic device 101 in operation 617. The electronic device 101 may transmit and/or receive data corresponding to the first application of the second external electronic device 225 to the server (e.g., metaverse server 100), in operation 619. The operations 617 and/or 619 may be substantially the same as, for example, operations 613 and/or 615, and thus detailed descriptions are not repeated.

Figure 7:
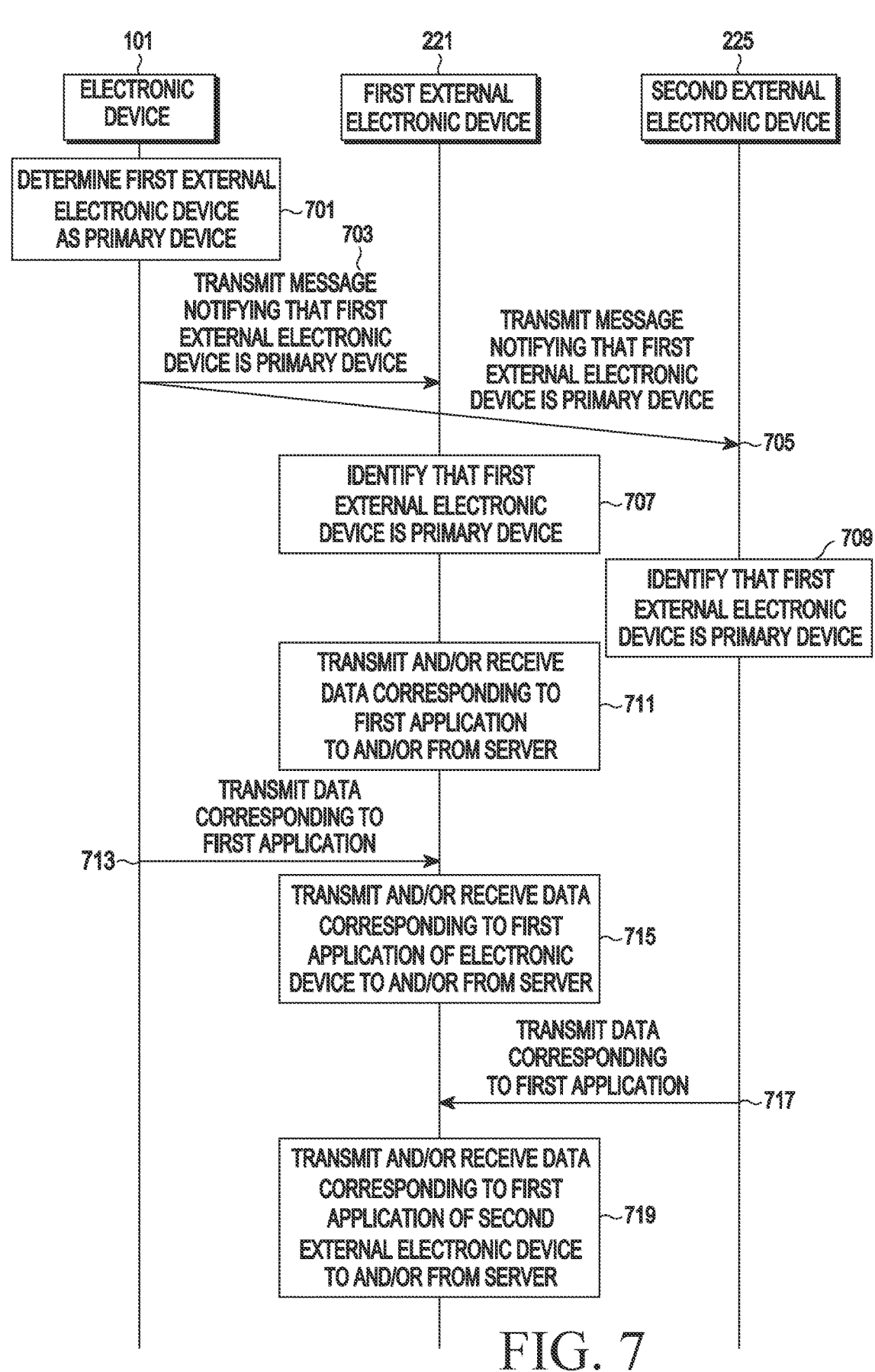
FIG. 7 is a flowchart illustrating operations of an electronic device and at least one external electronic device according to an embodiment of the disclosure.

FIG. 7 is a flowchart illustrating operations of an electronic device and at least one external electronic device according to an embodiment of the disclosure.

Referring to FIG. 7, according to an embodiment, in operation 701, the electronic device 101 may determine the first external electronic device 221 as a primary device. For example, as described with reference to FIG. 5, the electronic device 101 may determine the primary device, based on the comparison result of the first information corresponding to the electronic device 101, the received second information corresponding to the first external electronic device 221, and the received third information corresponding to the second external electronic device 225, and there is no limitation on the determining method. In operation 703, the electronic device 101 may transmit a message indicating that the first external electronic device 221 is the primary device for the first application to the first external electronic device 221. In operation 705, the electronic device 101 may transmit a message indicating that the first external electronic device 221 is the primary device for the first application to the second external electronic device 225. Those skilled in the art will understand that operations 703 and 705 may be one operation when the message indicating that the device is a primary device is multicast or broadcasted. In operation 707, the first external electronic device 221 may identify that the first external electronic device 221 is a primary device. In operation 709, the second external electronic device 225 may identify that the first external electronic device 221 is a primary device.

According to one embodiment, in operation 711, based on being selected as the primary device, the first external electronic device 221 may transmit and/or receive data corresponding to the first application with a server (e.g., metaverse server 100). For example, the first external electronic device 221 may establish a PDU session (or may be a PDN session, and/or an EPS bearer, but is not limited) with a server (e.g., the metaverse server 100) for the first application. The first external electronic device 221 may transmit and/or receive data corresponding to the first application with a server (e.g., the metaverse server 100) through the established PDU session. When the first external electronic device 221 communicates with a server (e.g., metaverse server 100) through cellular communication, the processor of the first external electronic device 221 may provide transmission data corresponding to the first application to a communication processor for cellular communication, and/or may receive received data from a server (e.g., metaverse server 100) through a communication processor.

According to an embodiment, the electronic device 101 may transmit data corresponding to the first application to the first external electronic device 221 in operation 713. As described above, since the electronic device 101 has identified that the first external electronic device 221 is the primary device for the first application, the electronic device 101 may transmit the data corresponding to the first application to the first external electronic device 221. Depending on implementation, other data (e.g., data corresponding to the second application) of the electronic device 101 may be transmitted based on cellular communication of the electronic device 101 instead of relaying the first external electronic device 221. The electronic device 101 may transmit data corresponding to the first application to the first external electronic device 221 through a short-range communication device (e.g., but not limited to, but not limited to, a Wi-Fi module) instead of a communication module for cellular communication. In operation 715, the first external electronic device 221 may transmit the received data corresponding to the first application of the electronic device 101 to a server (e.g., the metaverse server 100), and/or may transmit data received from a server (e.g., metaverse server 100) to the electronic device 101. For example, the first external electronic device 221 may identify the electronic device 101 and/or the metaverse server 100, based on the destination IP address included in the outgoing and/or incoming IP packets, but this is an example and the identification method is not limited. Accordingly, the electronic device 101 may receive an IP packet in which the IP address corresponding to the electronic device 101 (or the first application) is set as the destination IP address through short-range communication. The second external electronic device 225 may transmit data corresponding to the first application to the first external electronic device 221 in operation 717. In operation 719, the first external electronic device 221 may transmit and/or receive data corresponding to the first application of the second external electronic device 225 with a server (e.g., metaverse server 100). The operations 717 and/or 719 may be substantially the same as, for example, operations 713 and/or 715, and thus detailed descriptions are not repeated.

Figure 8:
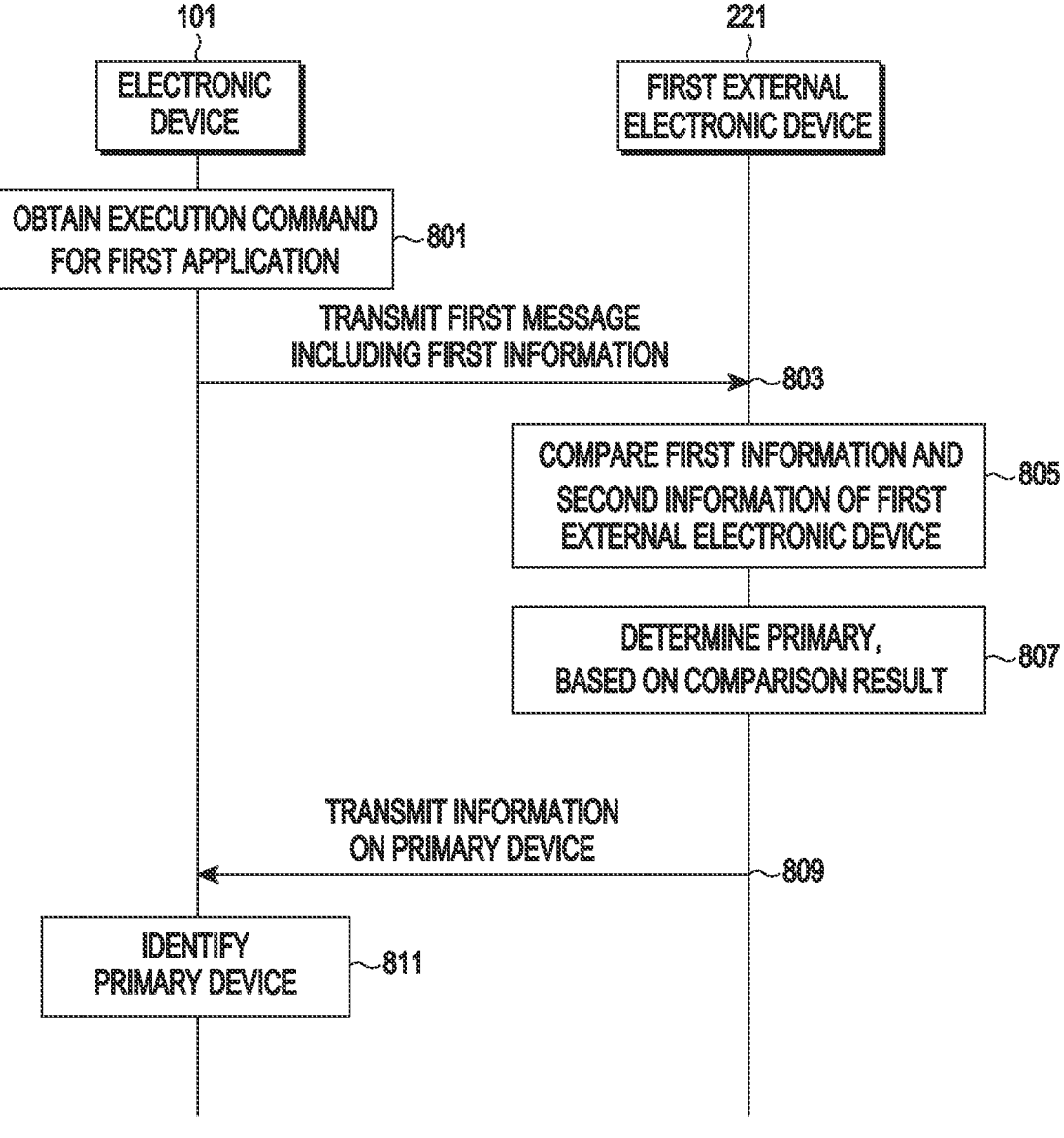
FIG. 8 is a flowchart illustrating operations of an electronic device and at least one external electronic device according to an embodiment of the disclosure.

FIG. 8 is a flowchart illustrating operations of an electronic device and at least one external electronic device according to an embodiment of the disclosure.

Referring to FIG. 8, according to an embodiment, an electronic device 101 (e.g., the processor 111) may obtain an execution command for the first application, in operation 801. The electronic device 101 may transmit a first message including first information, in operation 803. The first message may include information for identifying the first application. The first message may include information causing the external electronic device to select a primary device for the first application, based on the first information. For example, the electronic device 101 may transmit the first message including the first information, based on satisfaction of the specified event after executing the first application. For example, while the first application is running and providing the metaverse service, the electronic device 101 may transmit a first message including the first information, based on the discovery of the external electronic device and/or satisfaction of a condition indicating a degradation of communication capability, but is not limited thereto.

In the embodiment of FIG. 5, the electronic device 101 collects information from surrounding external electronic devices and determines a primary device, based on the collected information. In the embodiment of FIG. 8, the electronic device 101 may provide information to the first external electronic device 221, and the primary device may be determined by the first external electronic device 221. In an example, the electronic device 101 may be configured to collect information and determine a primary device. In an example, the electronic device 101 may be set to provide information and receive information about a primary device.

In an example, the electronic device 101 may select a device for collecting information and determining a primary device through negotiation with an external electronic device. For example, when the electronic device 101 and an external electronic device transmit and receive messages through Wi-Fi Direct, a group owner defined in Wi-Fi Direct may collect information and determine a major device, but is not limited thereto. For example, in the embodiment of FIG. 5, in the process of establishing a Wi-Fi direct connection, the electronic device 101 may be determined as a group owner, and accordingly, the electronic device 101 may collect information (e.g., second information and third information) of at least one external electronic device and determine a primary device. For example, in the embodiment of FIG. 8, in the process of establishing a Wi-Fi connection, the electronic device 101 may be determined as a group client, and accordingly, the electronic device 101 may transmit first information for selecting a primary device to the first external electronic device 221 as a group owner. For example, when the electronic device 101 and an external electronic device transmit and receive messages through Bluetooth, a master defined in Bluetooth may collect information and determine a primary device, but is not limited thereto. For example, information may be exchanged based on a service discovery protocol (SDP) of Bluetooth, but this is exemplary and not limited.

According to an embodiment, in operation 805, the first external electronic device 221 may compare the received first information and the second information of the first external electronic device 221. The external electronic device 106 may determine the primary device in operation 807, based on the comparison result. The external electronic device 106 may transmit information about the primary device to the electronic device 101 in operation 809. In operation 811, the electronic device 101 may identify the primary device. Thereafter, the electronic device 101 may operate according to the selection result of the primary device. For example, when the electronic device 101 is determined as the primary device, the electronic device 101 may transmit and/or receive data corresponding to its first application with the metaverse server 100, and may relay data corresponding to the first application of the first external electronic device 221. For example, when the electronic device 101 is determined as a secondary device, the electronic device 101 may transmit and/or receive data corresponding to the first application with the metaverse server 100 through relaying of the first external electronic device 221.

Figure 9A:
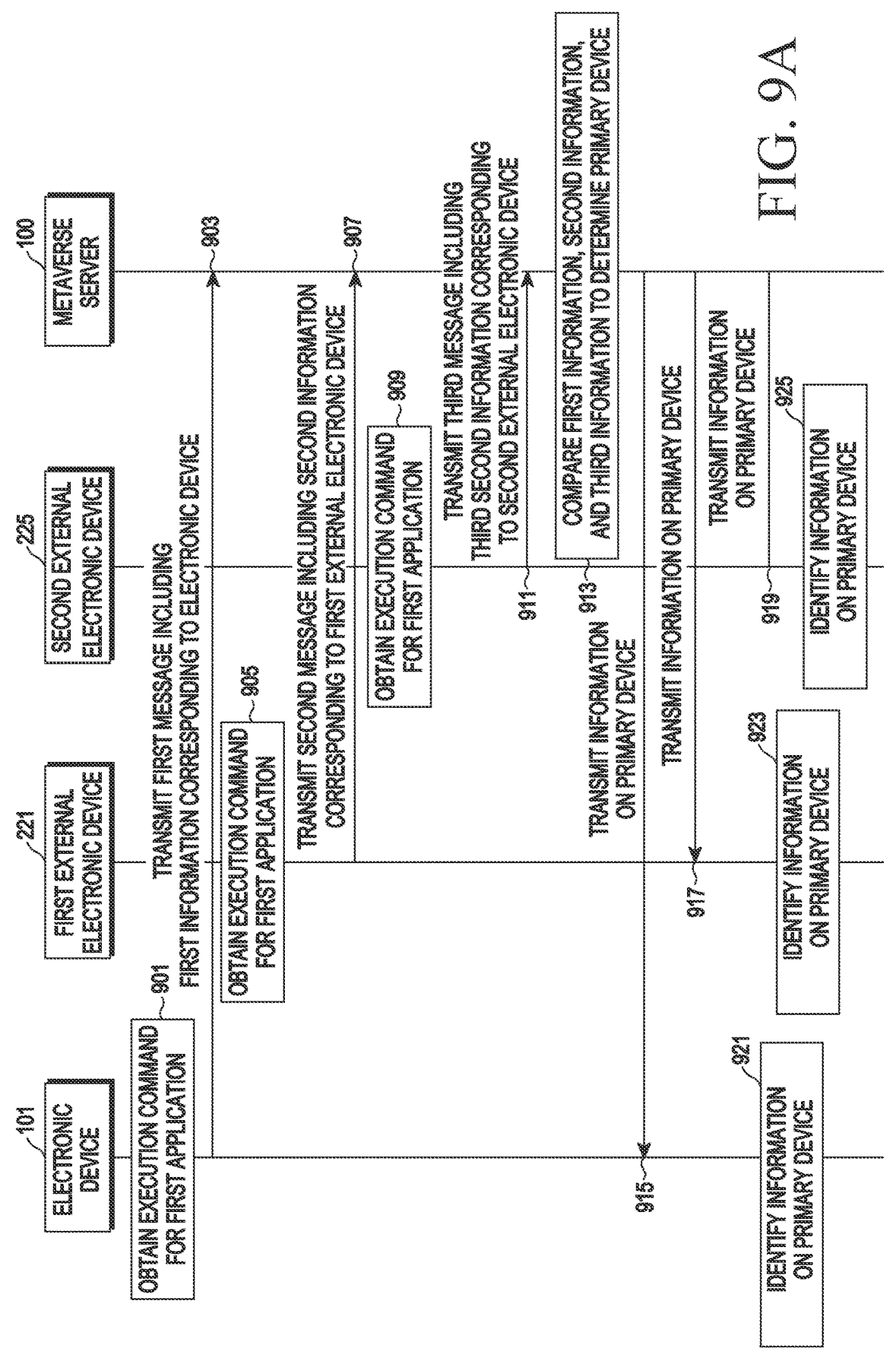
FIG. 9A is a flowchart illustrating an operation of an electronic device and at least one external electronic device according to an embodiment of the disclosure.
Figure 9B:
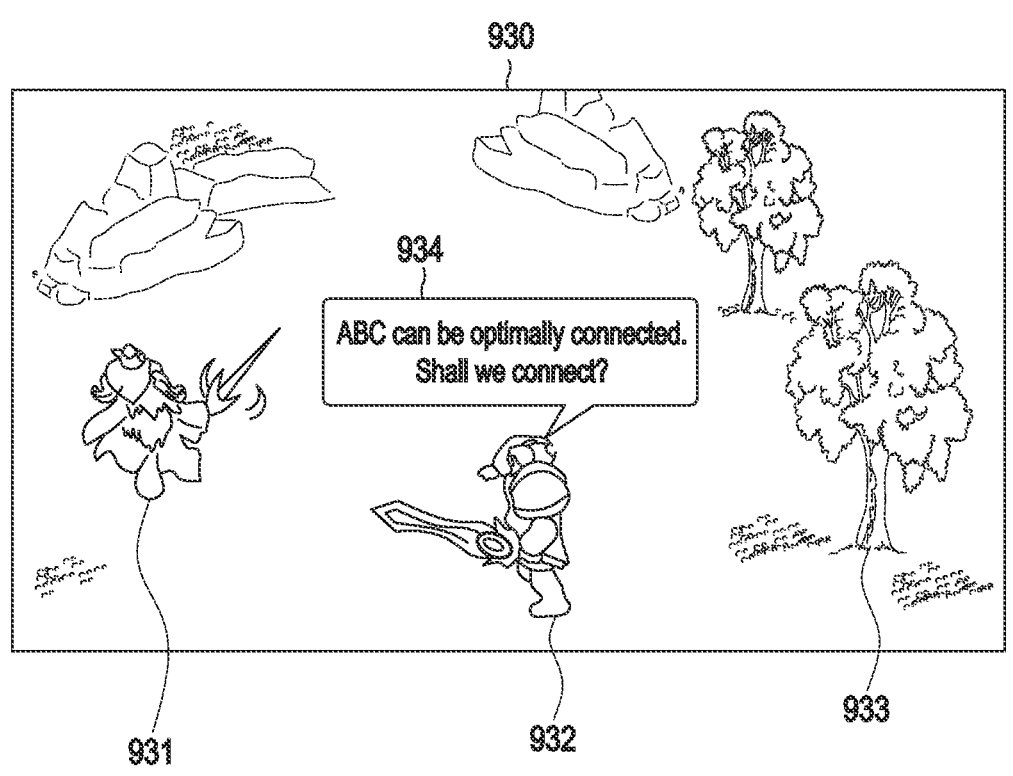
FIG. 9B is an example of a screen corresponding to a metaverse service according to an embodiment of the disclosure.

FIG. 9A is a flowchart illustrating an operation of an electronic device and at least one external electronic device according to an embodiment of the disclosure. The embodiment of FIG. 9A will be described with reference to FIG. 9B. FIG. 9B is an example of a screen corresponding to a metaverse service according to an embodiment of the disclosure.

Referring to FIGS. 9A and 9B, according to an embodiment, an electronic device 101 (e.g., the processor 111) may obtain an execution command of the first application in operation 901. The electronic device 101 may transmit a first message including first information corresponding to the electronic device 101 to a metaverse server 100 in operation 903. In operation 905, a first external electronic device 221 may obtain an execution command of the first application. The first external electronic device 221 may transmit a second message including second information corresponding to the first external electronic device to the metaverse server 100 in operation 907. In operation 909, a second external electronic device 225 may obtain an execution command of the first application. The second external electronic device 225 may transmit a third message including third information corresponding to the second external electronic device 225 to the metaverse server 100 in operation 911. In an example, the first message, the second message, and the third message may be transmitted through a PDU session established for the first application, for example, but this is illustrative and not limited. In addition, the first message, the second message, and the third message may be transmitted before, for example, execution of the first application, or may be transmitted after execution of the first application.

According to one embodiment, in operation 913, the metaverse server 100 compares the first information, the second information, and the third information to determine the primary device. For example, the metaverse server 100 may select the primary device, based on the comparison result of the collected information (or the comparison result of the score calculated according to the information), but the selection method is not limited. In an example, the metaverse server 100 may determine the primary device, based on the request from the electronic device 101, the first external electronic device 221, and/or the second external electronic device 225. In this case, the electronic device 101, the first external electronic device 221, and/or the second external electronic device 225 may transmit a request including information (or user identification information) capable of specifying the electronic device 101, the first external electronic device 221, and the second external electronic device 225 to the metaverse server 100. In an example, the metaverse server 100 may identify that the devices 101, 106, and 107 are in close proximity using information associated with the locations of the electronic device 101, the first external electronic device 221, and the second external electronic device 225, and correspondingly, may determine at least one of the electronic device 101, the first external electronic device 221, and the second external electronic device 225 as a primary device. Information associated with location may include GPS information, WPS information, and/or base station information of cellular communication, but is not limited thereto.

According to one embodiment, the metaverse server 100 may transmit information on the primary device to the electronic device 101 in operation 915. The metaverse server 100 may transmit information on the primary device to the first external electronic device 221 in operation 917. The metaverse server 100 may transmit information on the primary device to the second external electronic device 225 in operation 919. In operation 921, the electronic device 101 may determine a data transmission/reception path, based on the information on the primary device. For example, when the electronic device 101 is selected as the primary device, the electronic device 101, the electronic device 101 may determine the transmission/reception path of data corresponding to the first application as a session established between the electronic device 101 and the metaverse server 100. For example, when the external electronic device is selected as the primary device, the electronic device 101 may determine the transmission/reception path of data corresponding to the first application as a session based on short-range communication between the electronic device 101 and the external electronic device and the session established between the external electronic device and the metaverse server 100. In operation 923, the second external electronic device 106 may determine the data transmission/reception path, based on the information on the primary device. In operation 925, the first external electronic device 107 may determine the data transmission/reception path, based on the information on the primary device. For example, the operations 921, 923, and/or 925 may be implemented to be performed before the first application is executed, or may be implemented to be performed after the first application is executed. FIG. 9B is a screen illustrating an embodiment in which a primary device is determined after a first application is executed, for example.

Referring to FIG. 9B, the electronic device 101 may receive data for representing a metaverse service (or virtual space) from the metaverse server 100. The electronic device 101 may display a screen 930 as shown in FIG. 9B, based on the received data. Although the screen 930 is shown as one image, for example, those skilled in the art will understand that when the electronic device 101 is implemented as an HMD device, binocular images for the screen 930 are displayed, or when the electronic device 101 is implemented as AR glasses, at least part of objects on the screen 930 may be displayed so as to overlap the real environment. For example, on the screen 930, an avatar 931 corresponding to the user of the electronic device 101, an avatar 932 corresponding to the external electronic device 106, and at least one object constituting the virtual environment 933 may be included, but is not limited. For example, the metaverse server 100 may provide a function for requesting configurations of primary devices. The metaverse server 100 may transmit data to the electronic device 101 such that an object 934 for a primary device setting request is included on the screen 930. Alternatively, the metaverse server 100 may transmit data for representing an object 934 for a primary device configuration request to the electronic device 101, based on a call of a corresponding function from the electronic device 101. In the electronic device 101, when selection of the object 934 is confirmed, the electronic device 101 may transmit a request for configuring the primary device to the metaverse server 100. For example, the primary device configuration request may include identification information of the electronic device 101 (or identification information of a user accessed using the electronic device 101) and/or identification information of an external electronic device (or identification information of a user accessed using the electronic device 101), but there is no limitation. The metaverse server 100 may identify that at least one of the electronic device 101 and the external electronic device is requested to be set as a primary device by using the received identification information of the external electronic device. The metaverse server 100 may determine at least one primary device, for example, based on the procedure of FIG. 9A. For example, the object 934 for the primary device configuration request may include information indicating that an electronic device corresponding to a user having an ID of "ABC" of the metaverse service can be set as a primary device. When the corresponding consent is confirmed, the electronic device corresponding to the ID of "ABC" may be determined as the primary device.

FIGS. 10A, 10B, 10C, 1D, 10E, and 10F are flowcharts illustrating operating methods of an electronic device according to various embodiments of the disclosure. Referring to FIGS. 10A to 10F, parameters for determining the primary device are described. In the embodiments of FIGS. 10A to 10F, for convenience of description, it is assumed that the electronic device 101 is an entity that determines the primary device, but those skilled in the art will understand that the entity that determines the primary device is not limited.

Referring to FIG. 10A, in operation 1001, an electronic device 101 according to an embodiment may identify at least one piece of first information corresponding to a first network to which the electronic device 101 is connected. The at least one piece of first information corresponding to the first network may be, for example, at least one piece of information corresponding to the first network for connection with the electronic device 101 and the metaverse server 100. In operation 1003, the electronic device 101 may identify at least one piece of second information corresponding to a second network to which the external electronic device is connected. In operation 1005, the electronic device 101 may identify a correspondence relationship between the first application and at least one piece of first information and/or a correspondence relationship between the first application and at least one piece of second information. In operation 1007, the electronic device 101 may determine the primary device, based on the correspondence relationship.

For example, the correspondence relationship between the first application and the at least one piece of first information may include whether identification information (e.g., AppID) of the first application is included in the traffic descriptor of the URSP rule provided by the first network. The fact that the identification information of the first application is included in the traffic descriptor of the URSP rule may mean that the corresponding network provides a network slice function for the first application. Providing a network slice may mean that a relatively large number of resources are provided for a corresponding application or that a policy for relatively reducing latency is provided, and accordingly, when the traffic descriptor of the URSP rule includes the identification information of the first application, a relatively high priority (or relatively high score) for being selected as a primary device may be given. For example, when the traffic descriptor of the URSP rule provided by the first network includes the identification information of the first application, the traffic descriptor of the URSP rule provided by the second network does not include the identification information of the first application, or the second network does not provide the URSP rule, the electronic device 101 using the first network may be determined as a primary device, or a higher priority (or higher score) may be given to the electronic device 101.

For example, the correspondence relationship between the first application and the at least one piece of first information may include whether edge computing (e.g., may include mobile edge computing (MEC), OCN, CDA, etc., but not limited) for the first application (or the first metaverse server 100) is provided in the first network. Providing edge computing may mean that a relatively large number of resources are provided for the application or that a policy for relatively reducing latency is provided, and accordingly, when edge computing is provided, a relatively high priority (or relatively high score) for being selected as a primary device may be given. The corresponding relationship may be identified as identification information of a network operator, for example. For example, identification information of a network operator providing edge computing for the first application may be stored in advance in an entity that determines a primary device, or may be accessed by the entity. The corresponding entity may determine whether to give a relatively high priority (or high score) to the corresponding network, based on whether the identification information of the operator of the first network is included in the pre-stored list. For example, when the identification information of the operator of the first network is included in the list of operators providing edge computing, and the identification information of the operator of the second network is not included in the list of operators providing edge computing, the electronic device 101 using the first network may be determined as a primary device, or a higher priority (or higher score) may be given to the electronic device 101. In addition to whether to provide edge computing, the network operators having a relationship with the metaverse service may be included in the list. For example, when the metaverse service is implemented by the first network operator, the first network operator may be included in the list. For example, it may be further considered whether the corresponding service (e.g., edge computing) is additionally allowed to devices other than the primary device. If, according to the network operator's policy, the corresponding service is permitted only to one device, the electronic device corresponding to the corresponding network may not be determined as the primary device. For example, it may be further considered whether or not there is a usage limit for the corresponding service (e.g., edge computing). If, according to the network operator's policy, there is a limit on the amount of usage for the corresponding service, the electronic device corresponding to the corresponding network may not be determined as the primary device, but this is an example.

Referring to FIG. 10B, in operation 1011, the electronic device 101 according to an embodiment may identify at least one piece of first information associated with the quality of the first network to which the electronic device 101 is connected. In operation 1013, the electronic device 101 may identify at least one piece of second information associated with the quality of the second network to which the external electronic device is connected. In operation 1015, the electronic device 101 may determine a primary device, based on at least one piece of the first information and at least one piece of the second information.

For example, the first information and/or the second information may include a radio access technology (RAT) and/or a core network type. For example, new radio (NR) may be set to have a higher priority (or higher score) than evolved-universal terrestrial radio access (E-UTRA), and/or fifth generation system (5GS) to have higher priority (or higher score) than EPS, but there is no limitation.

For example, the first information and/or the second information may include whether carrier aggregation (CA) is supported and/or the number of formed carrier components (CCs). For example, as CA is supported and/or the number of CCs increases, a higher priority (or higher score) may be assigned, but there is no limitation.

For example, the first information and/or the second information may include the size of a bandwidth. For example, the higher the bandwidth, the higher priority (or higher score) may be assigned, but there is no limitation.

For example, the first information and/or the second information may include whether a corresponding network additionally supports Wi-Fi near a cell for cellular communication. For example, a high priority (or high score) may be given to a case in which Wi-Fi is additionally supported, but there is no limitation.

For example, the first information and/or the second information may include a communication price. For example, a high priority (or high score) may be given to a case in which the communication price is relatively low, but there is no limitation.

For example, the first information and/or the second information may include expected (or measured) latency.

For example, a high priority (or high score) may be assigned to a case in which latency is relatively low, but there is no limitation.

For example, the first information and/or the second information may include a strong electric field. Parameters (e.g., reference signal received power (RSRP), reference signal received quality (RSRQ), reference signal strength indicator (RSSI), signal-to-interference-and-noise ratio (SINR), signal-to-noise ratio (SNR), modulation and coding scheme (MCS) order, and/or spectral efficiency) for determining whether the field is strong are not limited. For example, the stronger the electric field, the higher priority (or higher score) may be assigned, but there is no limitation.

For example, the first information and/or the second information may include whether the corresponding communication is Wi-Fi communication. For example, in an environment such as in a building, Wi-Fi communication may provide better quality than cellular communication, and in the case of Wi-Fi, a high priority (or high score) may be given, but there is no limitation.

Referring to FIG. 10C, in operation 1021, the electronic device 101 according to an embodiment may identify at least one piece of first information associated with hardware features of the electronic device 101. In operation 1023, the electronic device 101 may identify at least one piece of second information associated with the hardware characteristics of the external electronic device. In operation 1025, the electronic device 101 may determine a primary device, based on at least one piece of first information and at least one piece of second information.

For example, the first information and/or the second information may include radio frequency (RF) performance. For example, RF performance of communication equipment installed in a vehicle may be better than RF performance of a mobile terminal. For example, a vehicle may use information included in a subscriber identification module (SIM) card existing nearby, and a high priority (or high score) may be given to an electronic device such as a vehicle, but is not limited thereto.

Figure 10D:
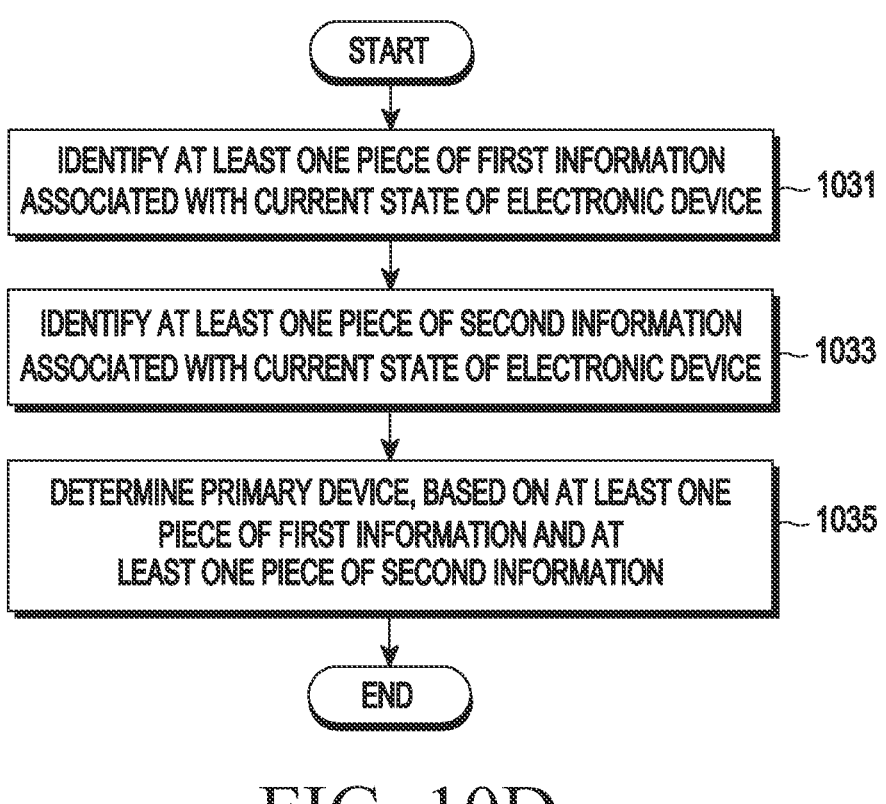

Referring to FIG. 10D, in operation 1031, the electronic device 101 according to an embodiment may identify at least one piece of first information associated with the current state of the electronic device 101. In operation 1033, the electronic device 101 may identify at least one piece of second information associated with the current state of the external electronic device. In operation 1035, the electronic device 101 may determine a primary device, based on at least one piece of first information and at least one piece of second information.

For example, the first information and/or the second information may include remaining battery capacity. For example, a high priority (or high score) may be given to a case where the battery level is high, but there is no limitation.

For example, the first information and/or the second information may include whether the temperature is overheated. For example, a low priority (or high score) may be given to the case of an overtemperature state, but there is no limitation.

Figure 10E:
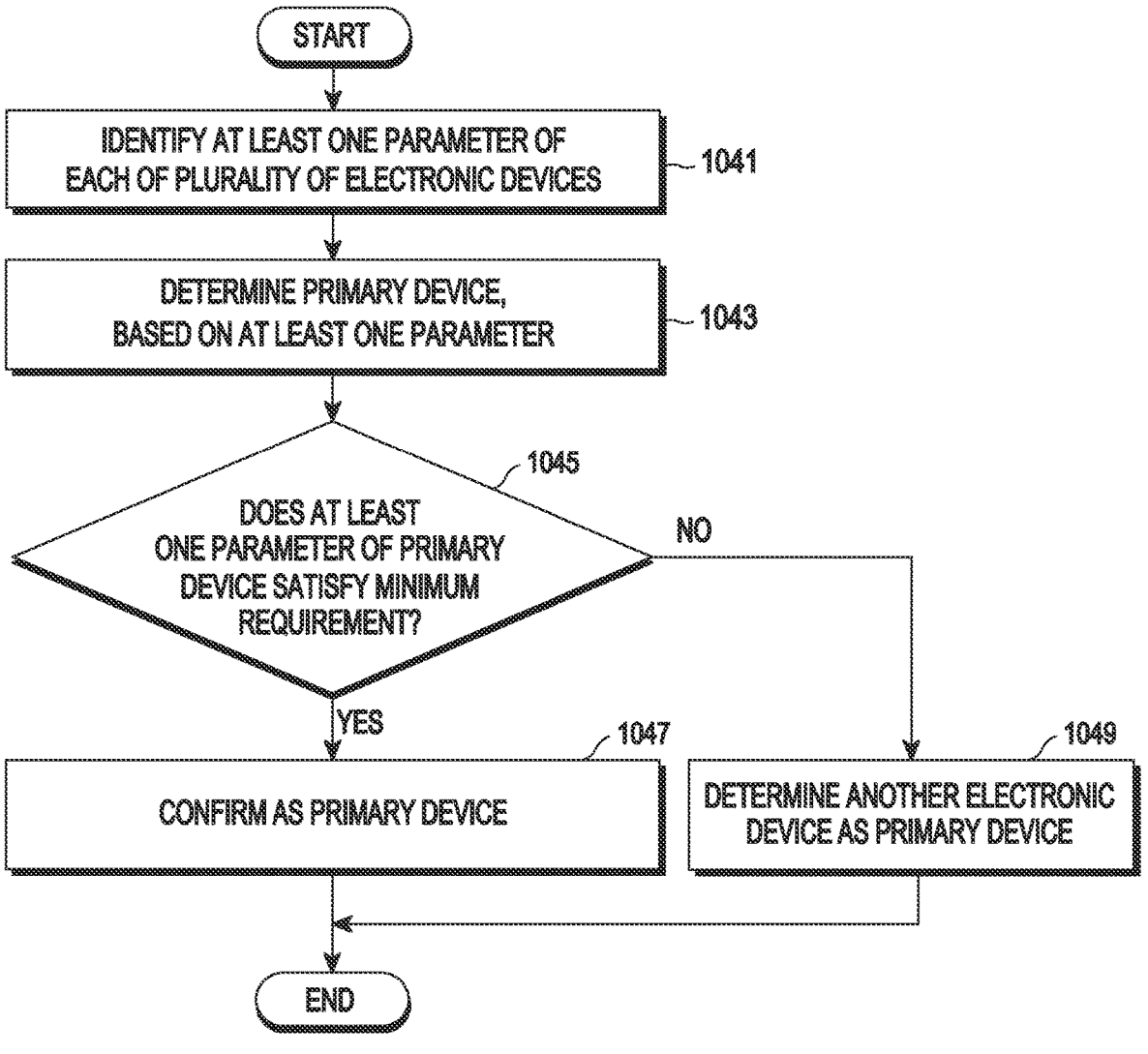

FIG. 10E is a flowchart illustrating a method of operating an electronic device according to an embodiment of the disclosure.

Referring to FIG. 10E, according to an embodiment, the electronic device 101 (e.g., the processor 111), in operation 1041 may identify at least one parameter of each of a plurality of electronic devices. For example, the electronic device 101 may identify at least one of the parameters described in FIGS. 10A to 10D of each of a plurality of electronic devices. In operation 1043, the electronic device 101 may determine a primary device based on at least one parameter. The electronic device 101 may determine a primary device, based on at least part of the parameters described in FIGS. 10A to 10D. In one example, the electronic device 101 may determine a score corresponding to each parameter, and may determine an electronic device having the highest sum score as the primary device. In one example, the electronic device 101 may set priorities for each parameter, and determine a primary device, based on a comparison result of a parameter with the highest priority. For example, when support for edge computing is determined as the highest priority, the electronic device 101 may determine an electronic device corresponding to a network supporting edge computing as a primary device. If there are a plurality of electronic devices corresponding to a network supporting edge computing, the electronic device 101 may select a primary device, based on the next priority. Embodiments of the disclosure are not limited to the above-described prioritization methods.

According to an embodiment, in operation 1045, the electronic device 101 may identify whether at least one parameter of the primary device satisfies a minimum requirement. For example, when a primary device is determined based on the summation of scores and/or a primary device is determined based on a parameter comparison result according to priority, there is a possibility that the value of a specific parameter does not satisfy the minimum requirements. For example, when one electronic device is primarily determined to be a major device, based on the summation of scores and/or the support of edge computing, which is the top priority, there is also a possibility that the electric field of the corresponding network is very weak or the remaining battery of the corresponding electronic device is in a low power state. The electronic device 101 may set minimum requirements for operating as a primary device for at least part of the at least one parameter. The electronic device 101 may primarily identify whether at least part of the parameters of the electronic device determined as the primary device satisfy minimum requirements. When the minimum requirements are satisfied (1045—Yes), the electronic device 101 may confirm the corresponding electronic device as the primary device in operation 1047. If the minimum requirement is not satisfied (1045—No), the electronic device 101 may determine another electronic device as the primary device in operation 1049. For example, the electronic device 101 may determine, as the primary device, an electronic device having a second sum score and/or an electronic device selected based on the next priority. Although not shown, those skilled in the art will understand that the electronic device 101 may identify again whether at least a part of at least one parameter of the corresponding electronic device satisfies the minimum requirements, and confirm the primary device when the satisfaction is satisfied. The minimum requirements may include, for example, data throughput equal to or greater than a threshold throughput, or whether mobility is supported, but there is no limitation.

Figure 10F:
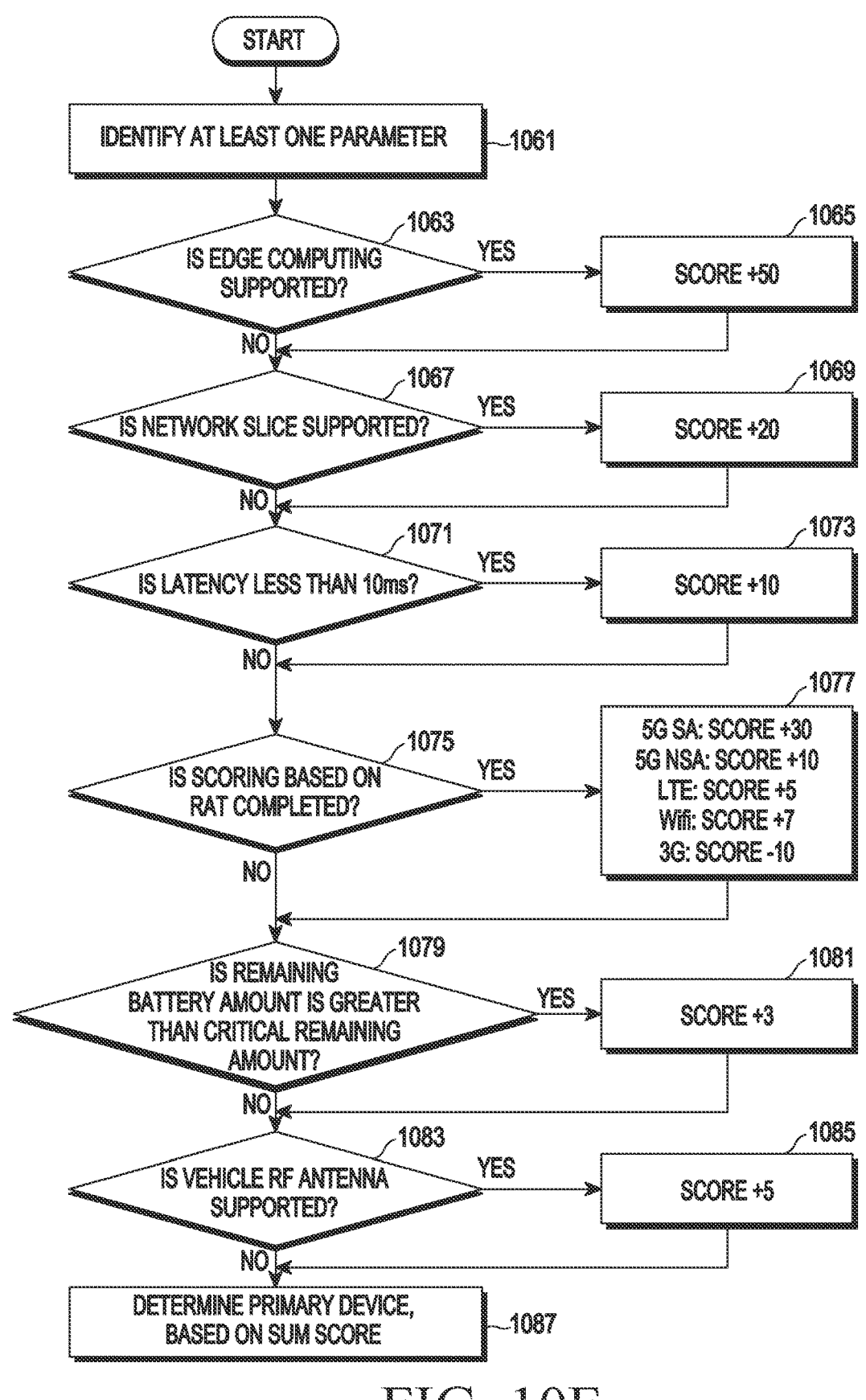

FIG. 10F is a flowchart illustrating a method of operating an electronic device according to an embodiment of the disclosure.

Referring to FIG. 10F, according to an embodiment, the electronic device 101 (e.g., the processor 111), in operation 1061, may identify at least one parameter of each of a plurality of electronic devices. In operation 1063, the electronic device 101 may identify whether a network corresponding to each of a plurality of electronic devices supports edge computing. When it is identified that edge computing is supported (1063—Yes), the electronic device 101, in operation 1065, may assign a score of, for example, +50 to the corresponding electronic device. The electronic device 101, in operation 1067, may identify whether a network corresponding to each of a plurality of electronic devices supports a network slice. When it is identified that the network slice is supported (1067—Yes), the electronic device 101, then in operation 1069, may assign a score of, for example, +20 to the corresponding electronic device. In operation 1071, the electronic device 101 may identify whether the latency of the network corresponding to each of the plurality of electronic devices is less than a critical latency, e.g., 10 ms. When it is identified that the latency is less than the threshold latency (1071—Yes), the electronic device 101 may, in operation 1073, assign a score of +10 to the corresponding electronic device. In operation 1075, the electronic device 101 may identify whether scoring, based on the RAT of the network corresponding to each of the plurality of electronic devices has been completed, when the scoring is not completed (1075—No), the electronic device 101, then in operation 1077, may assign a score of +30 to 5G stand-alone (SA), may assign a score of +10 to 5G non-stand alone (NSA), may assign a score of +5 to LTE, may assign a score of +7 to Wi-Fi, and may assign a score of −10 to 3G, for example. In operation 1079, the electronic device 101 may identify whether the remaining battery amount of each of the plurality of electronic devices is greater than or equal to a critical remaining amount. When it is identified that the remaining battery amount exceeds the critical remaining amount (1079—Yes), the electronic device 101 may, then in operation 1081, assign a score of, for example, +3 to the corresponding electronic device. In operation 1083, the electronic device 101 may identify whether each of the plurality of electronic devices supports a vehicle RF antenna. When it is identified that the vehicle RF antenna is supported (1083—Yes), the electronic device 101, then in operation 1085, may assign a score of, for example, +5 to the corresponding electronic device. In operation 1087, the electronic device 101 may determine a primary device, based on the sum score. Embodiments of the disclosure are not limited to the method shown in FIG. 10F, and there is no limitation on the types of parameters used for the determination, or the scores for the parameters.

Figure 11:
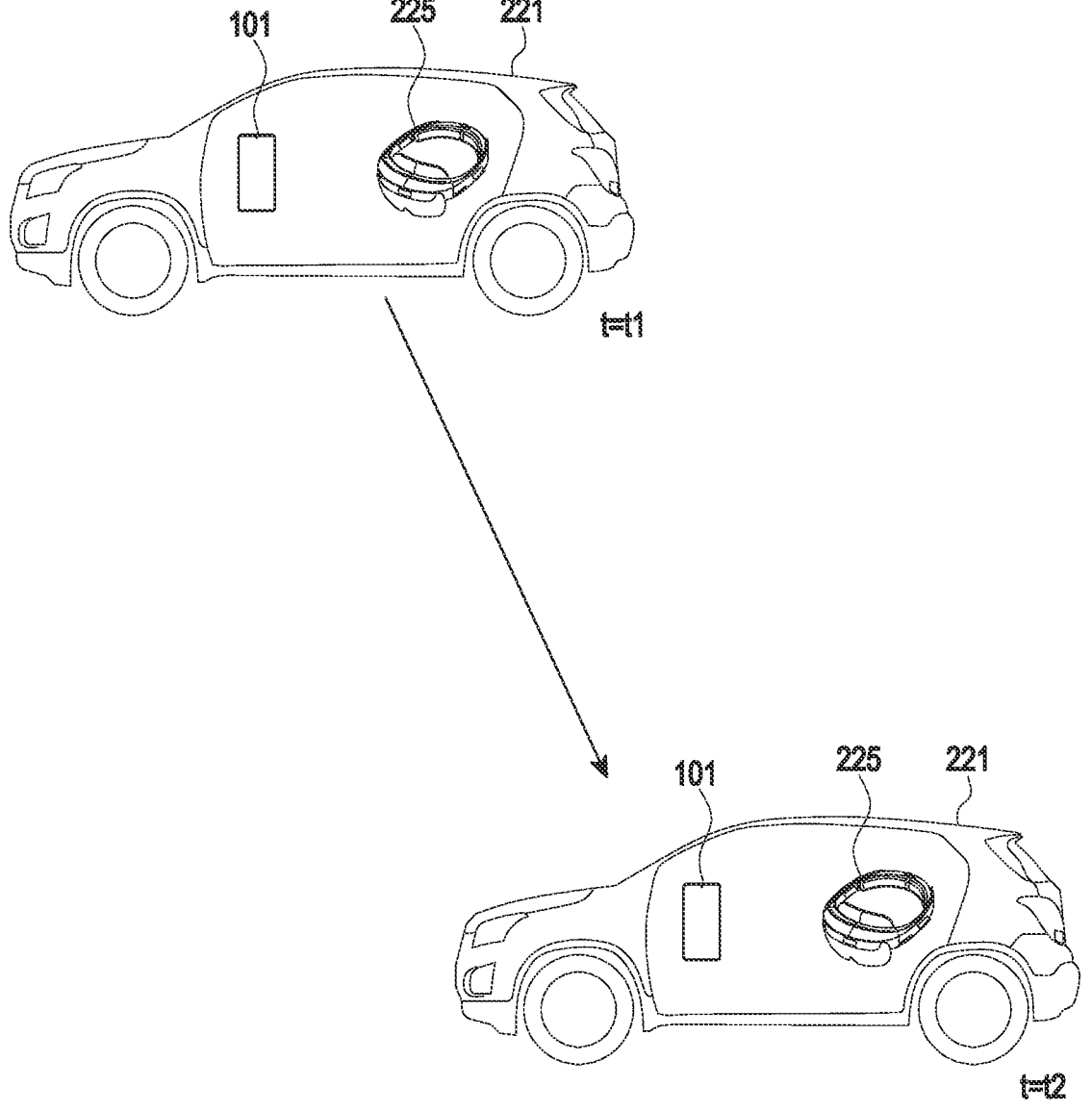
FIG. 11 is a diagram illustrating movement of electronic devices according to an embodiment of the disclosure.

FIG. 11 is a diagram illustrating movement of electronic devices according to an embodiment of the disclosure.

Referring to FIG. 11, for example, a first external electronic device 221 may be implemented as a vehicle (or a communication device within the vehicle). It is assumed that a user holding an electronic device 101 and a user holding (or wearing) a second external electronic device 225 board the first external electronic device 221 (or a vehicle to which the first external electronic device 221 is connected). For example, electronic devices may move from the first time point t1 to the second time point t2. Accordingly, there is a possibility that network environments are changed. For example, at the first time point t1, since the network corresponding to the electronic device 101 supports edge computing, the electronic device 101 may be determined as a primary device. Meanwhile, at the second time point t2, the network corresponding to the electronic device 101 may be in the weak electric field, and accordingly, the primary device may be changed to an electronic device corresponding to another network in the strong electric field. In this way, according to a change in the network environment, a primary device may need to be changed.

Figure 12:
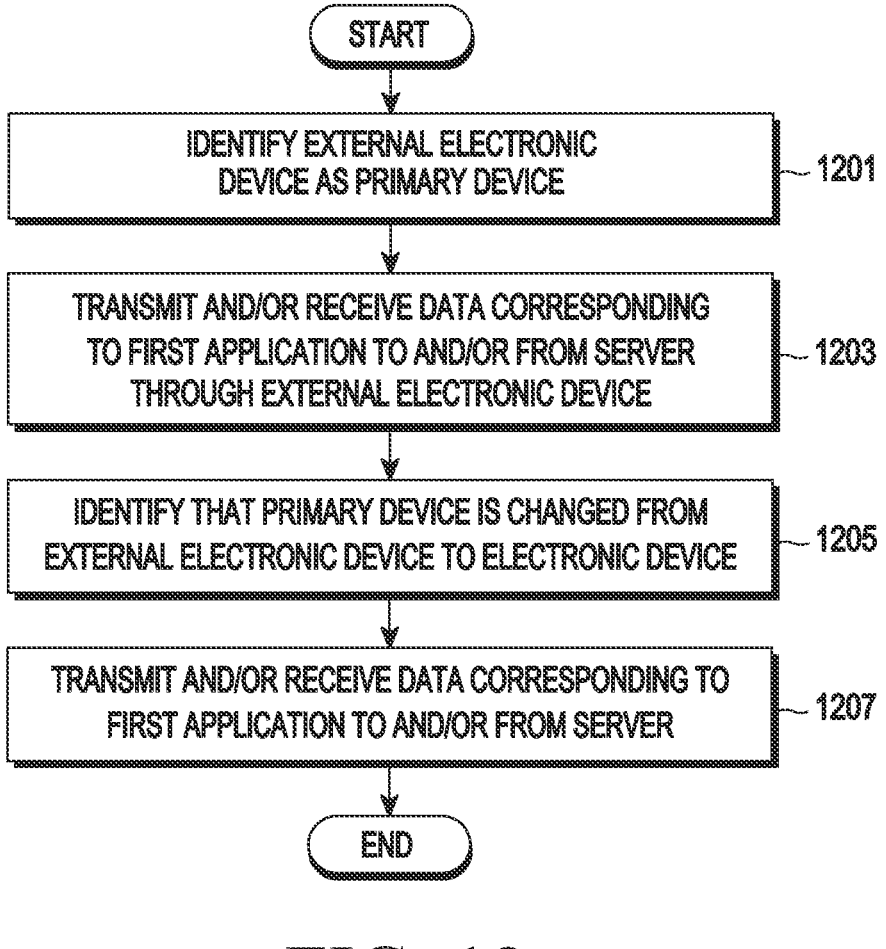
FIG. 12 is a diagram illustrating movement of electronic devices according to an embodiment of the disclosure.

FIG. 12 is a diagram illustrating movement of electronic devices according to an embodiment of the disclosure.

Referring to FIG. 12, according to an embodiment, an electronic device 101 (e.g., the processor 111), in operation 1201, may identify an external electronic device as a primary device. As described above, the entity determining the primary device may be any one of the electronic device 101, an external electronic device, or a metaverse server. In operation 1203, the electronic device 101 may transmit and/or receive data corresponding to the first application with a server (e.g., metaverse server 100) through an external electronic device. In operation 1205, the electronic device 101 may identify that the primary device is changed from the external electronic device to the electronic device 101. In one example, the primary device may identify that a change of the primary device is required based on the network capability not satisfying the specified condition. For example, the specified condition may be determined as a condition for being determined as a primary device, a condition that is more relaxed than the condition for being determined as a primary device in consideration of hysteretic characteristics, or may be determined that a change in a primary device is required when the specified condition is satisfied for a specified period or longer. For example, based on the confirmation that the change of the primary device is required, the current primary device may re-determine the primary device as described above, or request another entity to re-determine the primary device, and the primary device may be re-determined. There are no restrictions on who makes the decision. When the primary device is re-determined, information on the new primary device may be notified to other electronic devices. For example, in the embodiment of FIG. 12, it is assumed that the primary device is determined to an electronic device. In operation 1207, the electronic device 101 may transmit and/or receive data corresponding to the first application with a server (e.g., the metaverse server 100). In addition, the electronic device 101 may relay data corresponding to the first application of another external electronic device. As described above, the change of the primary device may be performed based, for example, on that a specified condition is not satisfied, however, according to another embodiment, the primary device may be re-determined according to a specified period. FIG. 12 is illustrative, and those skilled in the art will understand that, for example, the electronic device 101 may be the primary device, and then another external electronic device is determined as the primary device.

Figure 13:
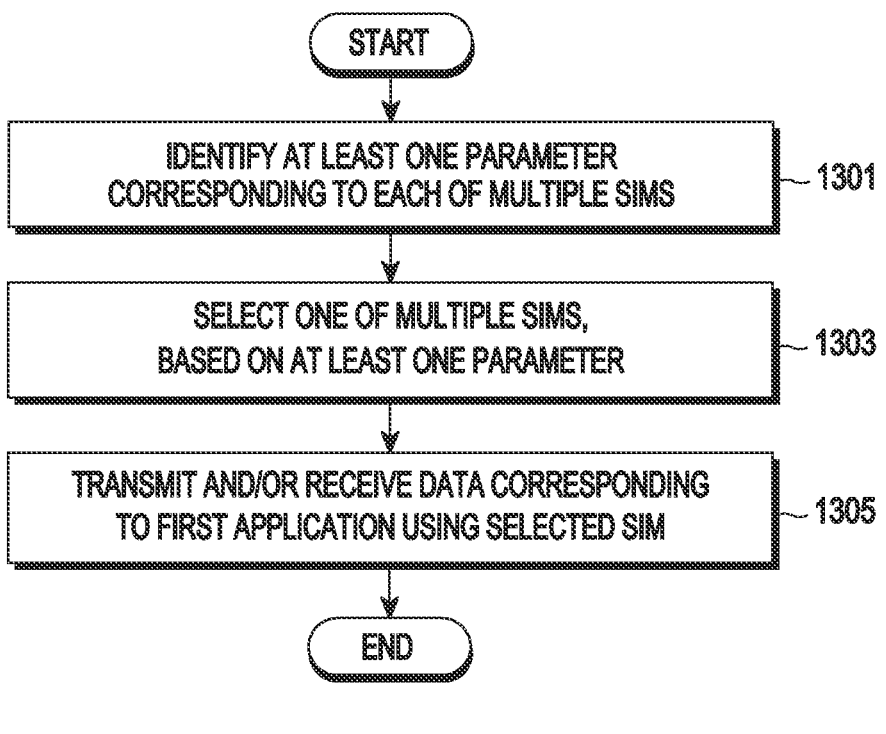
FIG. 13 is a flowchart illustrating an operation of an electronic device according to an embodiment of the disclosure.

FIG. 13 is a flowchart illustrating an operation of an electronic device according to an embodiment of the disclosure.

Referring to FIG. 13, according to an embodiment, an electronic device 101 (e.g., the processor 111), in operation 1301, may identify at least one parameter corresponding to each of the multiple SIMs. In the embodiment illustrated in FIG. 13, it is assumed that the electronic device 101 may perform communication by selecting one of the multiple SIMs, and network operators corresponding to the respective SIMs are different. The multiple SIMs may mean, for example, a plurality of removable SIMs (hereinafter referred to as rSIMs), an rSIM and an embedded SIM (hereinafter referred to as eSMIs), or a plurality of profiles activated based on the eSIM will be understood by those skilled in the art. At least one parameter may be, for example, at least part of the various types of parameters described with reference to FIGS. 10A to 10D.

According to an embodiment, in operation 1303, the electronic device 101 may select one of the multiple SIMs, based on at least one parameter. For example, in another embodiment, when at least one primary device is determined based on at least one parameter of each of a plurality of electronic devices, the electronic device 101 may determine a SIM to operate as one primary device based on at least one parameter of each of the multiple SIMs. Alternatively, when at least one primary device among a plurality of electronic devices is determined, each of multiple SIMs may be determined as a candidate for determining a primary device, such as an electronic device corresponding to the first SIM and an electronic device corresponding to the second SIM. In operation 1305, the electronic device 101 may transmit and/or receive data corresponding to the first application using the selected SIM.

According to an embodiment, the electronic device 101 may include at least one first communication device (part of 117) supporting at least one short-range communication, at least one second communication device (part of 117) supporting cellular communication, and at least one processor. The at least one processor 111 may be configured to transmit a first message for requesting first information to the external electronic devices 221 and 225 supporting the at least one short-range communication through the at least one first communication device (part of 117), based on the execution command of the first application. The first message may include information for identifying the first application. The at least one processor 111 may be configured to receive a second message including the first information corresponding to the first message from the external electronic devices 221 and 225 through the at least one first communication device (part of 117). The first information may be used to determine a primary device configured to transmit and/or receive data to and/or from a server corresponding to the first application. The at least one processor 111 may be configured to compare the first information included in the second message and the second information corresponding to the electronic device. The second information may be used to determine the primary device transmitting and/or receiving data to and/or from the server. The at least one processor 111 may be configured to transmit and/or receive data corresponding to the first application to and/or from the server through a part of the at least one second communication device 117, based on the electronic device being determined as the primary device, based on the comparison result of the first information and the second information. The at least one processor 111 may be configured to transmit and/or receive the data corresponding to the first application to and/or from the server through the external electronic devices 221 and 225 through the at least one first communication device (part of 117), based on the external electronic devices 221 and 225 being determined as the primary device, based on a comparison result of the first information and the second information.

According to an embodiment, the at least one processor 111 may be further configured to relay the data corresponding to the first application of the external electronic devices 221 and 225, based on the electronic device 101 being determined as the primary device, based on the comparison result of the first information and the second information.

According to an embodiment, the at least one processor 111 may, as at least a part of the relaying data corresponding to the first application of the external electronic devices 221 and 225, receive transmission data generated by the external electronic devices 221 and 225 from the external electronic devices 221 and 225 through the at least one first communication device (part of 117). The at least one processor 111 may be configured to, as at least a part of the relaying data corresponding to the first application of the external electronic devices 221 and 225, transmit the transmission data to the server through a part of the at least one second communication device 117.

According to an embodiment, the at least one processor 111 may, as at least a part of the relaying the data corresponding to the first application of the external electronic devices 221 and 225, receive received the data corresponding to the external electronic devices 221 and 225 from the external electronic devices 221 and 225 from the server through the at least one second communication device (part of 117). The at least one processor 111 may be configured to, as at least a part of the relaying data corresponding to the first application of the external electronic devices 221 and 225, transmit the received data to the external electronic device 221 or 225 through a part of the at least one first communication device 117.

According to an embodiment, the at least one processor 111 may be further configured to determine at least one of the electronic device 101 and the external electronic devices 221 and 225 as the primary device, based on at least one first parameter corresponding to the electronic device 101 included in the first information and at least one second parameter corresponding to the external electronic devices 221 and 225 included in the second information.

According to an embodiment, the at least one processor 111 may, as at least a part of the determining at least one of the electronic device 101 and the external electronic devices 221 and 225 as the primary device, based on the at least one first parameter and the at least one second parameter, determine the electronic device 101 as the primary device, based on a first network operator corresponding to a first network to which the electronic device 101 is connected included in the at least one first parameter being a designated network operator. The at least one processor 111 may be configured, as at least a part of the determining at least one of the electronic device 101 and the external electronic devices 221 and 225 as the primary device, based on the at least one first parameter and the at least one second parameter, to determine the external electronic devices 221 and 225 as the primary device, based on a second network operator corresponding to a second network to which the external electronic devices 221 and 225 included in the at least one second parameter are connected being the designated network operator.

According to an embodiment, the designated network operator may be a network operator that provides an edge computing function associated with the first application.

According to an embodiment, the designated network may be a network operator providing a network slice function associated with the first application.

According to an embodiment, the at least one processor 111 may be configured, based on the first network operator corresponding to the first network to which the electronic device 101 is connected included in the at least one first parameter being a designated network operator, as at least a part of the determining the electronic device 101 as the primary device, to determine the electronic device 101 as the primary device, based on identification information of the first application being included in a traffic descriptor of a first URSP rule by the first network operator.

According to an embodiment, the at least one processor 111 may be configured, based on the second network operator corresponding to the second network to which the external electronic devices 221 and 225 included in the at least one second parameter are connected being the designated network operator, as at least a part of the determining the external electronic devices 221 and 225 as the primary device, to determine the external electronic devices 221 and 225 as the primary device, based on identification information of the first application being included in a traffic descriptor of a second URSP rule by the second network operator.

According to an embodiment, the at least one processor 111 may be configured, as at least a part of the determining at least one of the electronic device 101 and the external electronic devices 221 and 225 as the primary device, based on the at least one first parameter and the at least one second parameter, to determine at least one of the electronic device 101 and the external electronic devices 221 and 225 as the primary device, based on a comparison result of information associated with quality of the first network to which the electronic device 101 included in the at least one first parameter is connected and information associated with quality of the second network to which the external electronic devices 221 and 225 included in the at least one second parameter are connected.

According to an embodiment, the at least one processor 111 may be configured, as at least a part of the determining at least one of the electronic device 101 and the external electronic devices 221 and 225 as the primary device, based on the at least one first parameter and the at least one second parameter, to determine at least one of the electronic device 101 and the external electronic devices 221 and 225 as the primary device, based on a comparison result of information associated with hardware characteristics of the electronic device 101 included in the at least one first parameter and information associated with hardware characteristics of the external electronic devices 221 and 225 included in the at least one second parameter.

According to an embodiment, the at least one processor 111 may be configured, as at least a part of the determining at least one of the electronic device 101 and the external electronic devices 221 and 225 as the primary device, based on the at least one first parameter and the at least one second parameter, to determine at least one of the electronic device 101 and the external electronic devices 221 and 225 as the primary device, based on a comparison result of information associated with the current state of the electronic device 101 included in the at least one first parameter and information associated with the current state of the external electronic devices 221 and 225 included in the at least one second parameter.

According to an embodiment, the at least one processor 111 may be configured, as at least a part of the determining at least one of the electronic device 101 and the external electronic devices 221 and 225 as the primary device, based on the at least one first parameter and the at least one second parameter, to confirm the primary device, based on at least part of the at least one parameter corresponding to the electronic device 101 determined as the primary device satisfies a minimum requirement.

According to an embodiment, the at least one processor 111 may be configured, as at least a part of the determining at least one of the electronic device 101 and the external electronic devices 221 and 225 as the primary device, based on the at least one first parameter and the at least one second parameter, to compare a first score calculated based on the at least one first parameter and a second score calculated based on the at least one second parameter, and to determine at least one of the electronic device 101 and the external electronic devices 221 and 225 as the primary device, based on a comparison result.

According to an embodiment, the at least one processor 111 may be configured, as at least a part of the determining at least one of the electronic device 101 and the external electronic devices 221 and 225 as the primary device, based on the at least one first parameter and the at least one second parameter, to compare at least one value determined based on priority among the at least one first parameter and at least one value determined based on priority among the at least one second parameter, and to determine at least one of the electronic device 101 and the external electronic devices 221 and 225 as the primary device, based on a comparison result.

According to an embodiment, the at least one processor 111 may be configured, after the primary device is determined, to receive a second message including third information from the external electronic devices 221 and 225 at a time point after the primary device is determined through the at least one first communication device (part of 117). Here, the third information may be used to determine a primary device configured to transmit and/or receive data to and/or from a server corresponding to the first application. According to an embodiment, the at least one processor 111 may be configured, after the primary device is determined, to compare the third information and fourth information at the time point corresponding to the electronic device 101. Here, the fourth information may be used to determine the primary device transmitting and/or receiving data to and/or from the server. According to an embodiment, the at least one processor 111 may be further configured, after the primary device is determined, to identify whether the primary device is changed, based on a comparison result of the third information and the fourth information.

According to an embodiment, the at least one processor 111 may be further configured, based on a comparison result of the first information, first sub information of a first SIM supported by the electronic device 101 of the second information, and second sub information of a second SIM supported by the electronic device 101 of the second information, to determine at least one of the external electronic devices 221 and 225, the first SIM, or the second SIM as the primary device.

According to an embodiment, the at least one processor 111 may be configured, based on the electronic device 101 being determined as the primary device, as at least a part of the transmitting and/or receiving the data corresponding to the first application to and/or from the server through the at least one second communication device (part of 117), to activate the first SIM, based on the first SIM being determined as the primary device, and to transmit and/or receive the data corresponding to the first application to and/or from the server, based on the first SIM. The at least one processor 111 may be configured, based on the electronic device 101 being determined as the primary device, as at least a part of the transmitting and/or receiving data corresponding to the first application to and/or from the server through the at least one second communication device (part of 117), and to activate the second SIM, based on the second SIM being determined as the primary device to transmit and/or receive data corresponding to the first application to and/or from the server, based on the second SIM.

According to an embodiment, an operation method of an electronic device 101 including at least one first communication device (part of 117) supporting at least one short-range communication and at least one second communication device (part of 117) supporting cellular communication may include transmitting a first message for requesting first information to the external electronic devices 221 and 225 supporting the short-range communication, based on the execution command of the first application, through the at least one first communication device (part of 117). Here, the first message may include information for identifying the first application. The operating method of the electronic device 101 may include receiving a second message including the first information corresponding to the first message from the external electronic device 221 or 225 through the at least one first communication device (part of 117). Here, the first information may be used to determine a primary device configured to transmit and/or receive data to and/or from a server corresponding to the first application. The operating method of the electronic device 101 may include comparing the first information included in the second message and the second information corresponding to the electronic device 101. Here, the second information may be used to determine the primary device transmitting and/or receiving data to and/or from the server. The operating method of the electronic device 101 may include transmitting and/or receiving the data corresponding to the first application to and/or from the server through the at least one second communication device (part of 117), based on the electronic device 101 being determined as the primary device, based on the comparison result of the first information and the second information. The operating method of the electronic device 101 may include transmitting and/or receiving the data corresponding to the first application from the server through the external electronic devices 221 and 225 through the at least one first communication device (part of 117), based on the external electronic devices 221 and 225 being determined as the primary device, based on the comparison result of the first information and the second information.

According to an embodiment, the operation method of the electronic device 101 may further include relaying the data corresponding to the first application of the external electronic devices 221 and 225, based on the electronic device 101 being determined as the primary device, based on the comparison result of the first information and the second information.

According to an embodiment, the operation of relaying the data corresponding to the first application of the external electronic devices 221 and 225 may include receiving the transmission data generated by the external electronic devices 221 and 225 from the external electronic devices 221 and 225 through the at least one first communication device (a part of 117). The operation of relaying the data corresponding to the first application of the external electronic devices 221 and 225 may include transmitting the transmission data to the server through the at least one second communication device (part of 117).

According to an embodiment, the operation of relaying the data corresponding to the first application of the external electronic devices 221 and 225 may include receiving reception data corresponding to the external electronic devices 221 and 225 from the server through a part of the at least one second communication device 117, from the external electronic devices 221 and 225. The operation of relaying the data corresponding to the first application of the external electronic devices 221 and 225 may include transmitting the received data through the at least one first communication device 117 to the external electronic device 221 and 225.

According to an embodiment, the operation method of the electronic device 101 may further include determining at least one of the electronic device 101 and the external electronic devices 221 and 225 as the primary device, based on at least one first parameter corresponding to the electronic device 101 included in the first information and at least one second parameter corresponding to the external electronic devices 221 and 225 included in the second information.

According to an embodiment, the operation of determining at least one of the electronic device 101 and the external electronic devices 221 and 225 as the primary device, based on at least one first parameter and at least one second parameter may include determining the electronic device 101 as the primary device, based on a first network operator corresponding to a first network to which the electronic device 101 is connected included in the at least one first parameter being a designated network operator. The operation of determining at least one of the electronic device 101 and the external electronic devices 221 and 225 as the primary device, based on at least one first parameter and at least one second parameter may include determining the external electronic devices 221 and 225 as the primary device, based on a second network operator corresponding to a second network to which the external electronic devices 221 and 225 included in the at least one second parameter are connected being the designated network operator.

According to an embodiment, the designated network operator may be a network operator providing an edge computing function associated with the first application.

According to an embodiment, the designated network may be a network operator providing a network slice function associated with the first application.

According to an embodiment, the operation of determining the electronic device 101 as the primary device, based on a first network operator corresponding to a first network to which the electronic device 101 is connected included in the at least one first parameter being a designated network operator may include determining the electronic device 101 as the primary device, based on the identification information of the first application being included in a traffic descriptor of a first URSP rule by the first network operator.

According to an embodiment, the operation of determining the external electronic devices 221 and 225 as the primary device, based on a second network operator corresponding to a second network to which the external electronic devices 221 and 225 included in the at least one second parameter are connected being the designated network operator may include determine the external electronic devices 221 and 225 as the primary device, based on the identification information of the first application being included in a traffic descriptor of a second URSP rule by the second network operator.

According to an embodiment, the operation of determining at least one of the electronic device 101 and the external electronic devices 221 and 225 as the primary device, based on at least one first parameter and at least one second parameter may include determining at least one of the electronic device 101 and the external electronic devices 221 and 225 as the primary device, based on a comparison result of information associated with quality of the first network to which the electronic device 101 is connected included in the at least one first parameter and information associated with quality of the second network to which the external electronic devices 221 and 225 are connected, included in the at least one second parameter.

According to an embodiment, the operation of determining at least one of the electronic device 101 and the external electronic devices 221 and 225 as the primary device, based on at least one first parameter and at least one second parameter may include determining at least one of the electronic device 101 and the external electronic devices 221 and 225 as the primary device, based on a comparison result of information associated with the characteristics of the hardware of the electronic device 101 included in the at least one first parameter and information associated with the hardware characteristics of the external electronic devices 221 and 225 included in the at least one second parameter.

According to an embodiment, the operation of determining at least one of the electronic device 101 and the external electronic devices 221 and 225 as the primary device, based on at least one first parameter and at least one second parameter may include determining at least one of the electronic device 101 and the external electronic devices 221 and 225 as the primary device, based on a comparison result of information associated with the current state of the electronic device 101 included in the at least one first parameter and information associated with the current state of the external electronic devices 221 and 225 included in the at least one second parameter.

According to an embodiment, the operation of determining at least one of the electronic device 101 and the external electronic devices 221 and 225 as the primary device, based on at least one first parameter and at least one second parameter may include confirming the primary device, based on at least a part of at least one parameter corresponding to the electronic device 101 determined as the primary device satisfying a minimum requirement.

According to an embodiment, the operation of determining at least one of the electronic device 101 and the external electronic devices 221 and 225 as the primary device, based on at least one first parameter and at least one second parameter may include comparing a first score calculated based on the at least one first parameter and a second score calculated based on the at least one second parameter, and determining at least one of the electronic device 101 and the external electronic devices 221 and 225 as the primary device, based on a comparison result.

According to an embodiment, the operation of determining at least one of the electronic device 101 and the external electronic devices 221 and 225 as the primary device, based on at least one first parameter and at least one second parameter may include comparing at least one value determined based on priority among the at least one first parameter and at least one value determined based on priority among the at least one second parameter, and determining at least one of the electronic device 101 and the external electronic devices 221 and 225 as the primary device, based on a comparison result.

According to an embodiment, the operating method of the electronic deice 101 may include receiving a second message including third information from the external electronic devices 221 and 225 at a time point after the primary device is determined through the at least one first communication device (part of 117) after the primary device is determined. Here, the third information may be used to determine a primary device configured to transmit and/or receive data to and/or from a server corresponding to the first application. According to an embodiment, the operating method of the electronic deice 101 may include comparing the third information and fourth information at the time point corresponding to the electronic device 101. Here, the fourth information may be used to determine the primary device transmitting and/or receiving data to and/or from the server. According to an embodiment, the operating method of the electronic deice 101 may include identifying whether the primary device is changed, based on a comparison result of the third information and the fourth information.

According to an embodiment, the operation method of the electronic deice 101 may include determining at least one of the external electronic devices 221 and 225, a first SIM, or a second SIM as the primary device, based on a comparison result of the first information, first sub information of first SIM supported by the electronic device 101 of the second information, and second sub information of second SIM supported by the electronic device 101 of the second information.

According to an embodiment, the operation of transmitting and/or receiving data corresponding to the first application to and/or from the server, through the at least one second communication device (part of 117), based on the electronic device 101 being determined as the primary device may include activating the first SIM, and transmitting and/or receiving data corresponding to the first application to and/or from the server, based on the first SIM. The operation of transmitting and/or receiving data corresponding to the first application to and/or from the server, through the at least one second communication device (part of 117), based on the electronic device 101 being determined as the primary device may include activating the second SIM, based on the second SIM being determined as the primary device, and transmitting and/or receiving data corresponding to the first application to and/or from the server, based on the second SIM.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 101). For example, a processor (e.g., the processor 111) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one first communication device configured to support at least one short-range communication;
   at least one second communication device configured to support cellular communication; and
   at least one processor, wherein the at least one processor is configured to:
      based on an execution command of a first application, transmit, through the at least one first communication device, a first message for requesting first information to external electronic devices supporting the at least one short-range communication, wherein the first message includes information for identifying the first application,
      receive, through the at least one first communication device, from the external electronic devices, a second message including the first information corresponding to the first message, wherein the first information is used to determine a primary device configured to transmit and/or receive data to and/or from a server corresponding to the first application,
      compare the first information included in the second message and second information corresponding to the electronic device, wherein the second information is used to determine the primary device transmitting and/or receiving data to and/or from the server,
      based on the electronic device being determined as the primary device based on a comparison result of the first information and the second information, transmit and/or receive, through the at least one second communication device, data corresponding to the first application to and/or from the server, and
      based on one of the external electronic devices being determined as the primary device based on the comparison result of the first information and the second information, transmit and/or receive, through the at least one first communication device, the data corresponding to the first application to and/or from the server through the external electronic devices.

2. The electronic device of claim 1, wherein the at least one processor is further configured to:
   based on the electronic device being determined as the primary device based on the comparison result of the first information and the second information, relay the data corresponding to the first application of the external electronic devices.

3. The electronic device of claim 2, wherein the at least one processor is further configured to, as at least a part of the relaying data corresponding to the first application of the external electronic devices:
   receive, from the external electronic devices, transmission data generated by the external electronic devices through the at least one first communication device, and
   transmit, through the at least one second communication device, the transmission data to the server.

4. The electronic device of claim 2, wherein the at least one processor is further configured to, as at least a part of the relaying data corresponding to the first application of the external electronic devices:
   receive, from the external electronic devices, reception data corresponding to the external electronic devices from the server through the at least one second communication device, and transmit, through the at least one first communication device, the reception data to the external electronic devices.

5. The electronic device of claim 1, wherein the at least one processor is further configured to:
   determine at least one of the electronic device and the external electronic devices as the primary device, based on at least one first parameter corresponding to the electronic device included in the first information and at least one second parameter corresponding to the external electronic devices included in the second information.

6. The electronic device of claim 5, wherein the at least one processor is further configured to, as at least a part of the determining at least one of the electronic device and the external electronic devices as the primary device, based on the at least one first parameter and the at least one second parameter:
   determine the electronic device as the primary device, based on a first network operator corresponding to a first network to which the electronic device is connected included in the at least one first parameter being a designated network operator, and
   determine one of the external electronic devices as the primary device, based on a second network operator corresponding to a second network to which the external electronic devices included in the at least one second parameter are connected being the designated network operator.

7. The electronic device of claim 6, wherein the designated network operator is a network operator configured to provide an edge computing function associated with the first application.

8. The electronic device of claim 6, wherein the designated network is a network operator configured to provide a network slice function associated with the first application.

9. The electronic device of claim 8, wherein the at least one processor is further configured to:
   based on the first network operator corresponding to the first network to which the electronic device is connected included in the at least one first parameter being a designated network operator, as at least a part of the determining the electronic device as the primary device, determine the electronic device as the primary device, based on identification information of the first application being included in a traffic descriptor of a first URSP rule by the first network operator, and
   based on the second network operator corresponding to the second network to which the external electronic devices included in the at least one second parameter are connected being the designated network operator, as at least a part of the determining the external electronic devices as the primary device, determine one of the external electronic devices as the primary device, based on the identification information of the first application being included in the traffic descriptor of a second URSP rule by the second network operator.

10. The electronic device of claim 5, wherein the at least one processor is further configured to, as at least a part of the determining at least one of the electronic device and the external electronic devices as the primary device, based on the at least one first parameter and the at least one second parameter, determine at least one of the electronic device and the external electronic devices as the primary device, based on a comparison result of information associated with quality of a first network to which the electronic device included in the at least one first parameter is connected and information associated with quality of a second network to which the external electronic devices included in the at least one second parameter are connected.

11. The electronic device of claim 5, wherein the at least one processor is further configured to, as at least a part of the determining at least one of the electronic device and the external electronic devices as the primary device, based on the at least one first parameter and the at least one second parameter:
   determine at least one of the electronic device and the external electronic devices as the primary device, based on a comparison result of information associated with hardware characteristics of the electronic device included in the at least one first parameter and information associated with hardware characteristics of the external electronic devices included in the at least one second parameter.

12. The electronic device of claim 5, wherein the at least one processor is further configured to, as at least a part of the determining at least one of the electronic device and the external electronic devices as the primary device, based on the at least one first parameter and the at least one second parameter:
   determine at least one of the electronic device and the external electronic devices as the primary device, based on a comparison result of information associated with a current state of the electronic device included in the at least one first parameter and information associated with a current state of the external electronic devices included in the at least one second parameter.

13. The electronic device of claim 5, wherein the at least one processor is further configured to, as at least a part of the determining at least one of the electronic device and the external electronic devices as the primary device, based on the at least one first parameter and the at least one second parameter, confirm the primary device, based on at least part of at least one parameter corresponding to the electronic device determined as the primary device satisfying a minimum requirement.

14. The electronic device of claim 5, wherein the at least one processor is further configured to, as at least a part of the determining at least one of the electronic device and the external electronic devices as the primary device, based on the at least one first parameter and the at least one second parameter:
   compare a first score calculated based on the at least one first parameter and a second score calculated based on the at least one second parameter, and
   determine at least one of the electronic device and the external electronic devices as the primary device, based on a comparison result.

15. The electronic device of claim 5, wherein the at least one processor is further configured to, as at least a part of the determining at least one of the electronic device and the external electronic devices as the primary device, based on the at least one first parameter and the at least one second parameter:
   compare at least one value determined based on priority among the at least one first parameter and at least one value determined based on priority among the at least one second parameter, and
   determine at least one of the electronic device and the external electronic devices as the primary device, based on a comparison result.

16. The electronic device of claim 1, wherein the at least one processor is further configured to:

receive, through the at least one first communication device, a second message including third information from the external electronic devices at a time point after the primary device is determined, after the primary device is determined, wherein the third information is used to determine the primary device configured to transmit and/or receive data to and/or from the server corresponding to the first application, compare the third information and fourth information at the time point corresponding to the electronic device, wherein the fourth information is used to determine the primary device transmitting and/or receiving data to and/or from the server, and identify whether the primary device is changed, based on a comparison result of the third information and the fourth information.

17. The electronic device of claim 1, wherein the at least one processor is further configured to:

determine at least one of the external electronic devices, a first SIM, or a second SIM as the primary device, based on a comparison result of the first information, first sub information of first SIM supported by the electronic device of the second information, and second sub information of second SIM supported by the electronic device of the second information.

18. The electronic device of claim 17, wherein the at least one processor is further configured to, based on the electronic device being determined as the primary device, as at least a part of the transmitting and/or receiving data corresponding to the first application to and/or from the server, through the at least one second communication device:

based on the first SIM being determined as the primary device, activate the first SIM, and transmit and/or receive data corresponding to the first application to and/or from the server, based on the first SIM, and based on the second SIM being determined as the primary device, activate the second SIM, and transmit and/or receive data corresponding to the first application to and/or from the server, based on the second SIM.

19. An operation method of an electronic device including at least one first communication device supporting at least one short-range communication and at least one second communication device supporting cellular communication, the method comprising:

based on an execution command of a first application, transmitting, through the at least one first communication device, a first message for requesting first information to external electronic devices supporting the at least one short-range communication, wherein the first message includes information for identifying the first application;

receiving, through the at least one first communication device, a second message including the first information corresponding to the first message from the external electronic devices, wherein the first information is used to determine a primary device configured to transmit and/or receive data to and/or from a server corresponding to the first application;

comparing the first information included in the second message and second information corresponding to the electronic device, wherein the second information is used to determine the primary device transmitting and/or receiving data to and/or from the server;

based on the electronic device being determined as the primary device based on a comparison result of the first information and the second information, transmitting and/or receiving data corresponding to the first application to and/or from the server through the at least one second communication device; and based on one of the external electronic devices being determined as the primary device based on the comparison result of the first information and the second information, transmitting and/or receiving the data corresponding to the first application to and/or from the server through the external electronic devices, through the at least one first communication device.

20. The method of claim 19, further comprising:

based on the electronic device being determined as the primary device based on the comparison result of the first information and the second information, relaying the data corresponding to the first application of the external electronic devices.

* * * * *